US012769422B2

(12) United States Patent
Lee et al.

(10) Patent No.: US 12,769,422 B2
(45) Date of Patent: Oct. 20, 2026

(54) ELECTRONIC DEVICE AND DRIVING METHOD THEREOF

(71) Applicant: Samsung Display Co., Ltd., Yongin-Si (KR)

(72) Inventors: Jeongheon Lee, Yongin-si (KR); Junghak Kim, Yongin-si (KR); Yun A Ma, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/922,391

(22) Filed: Oct. 22, 2024

(65) Prior Publication Data

US 2025/0315125 A1 Oct. 9, 2025

(30) Foreign Application Priority Data

Apr. 4, 2024 (KR) ........................ 10-2024-0046121

(51) Int. Cl.
*G06F 3/041* (2006.01)
*G06F 3/044* (2006.01)

(52) U.S. Cl.
CPC ........ *G06F 3/04166* (2019.05); *G06F 3/0443* (2019.05); *G06F 3/0446* (2019.05)

(58) Field of Classification Search
CPC .. G06F 3/04166; G06F 3/0443; G06F 3/0446; G06F 3/044; G06F 3/041
See application file for complete search history.

(56) References Cited

U.S. PATENT DOCUMENTS

| | | | | |
|---|---|---|---|---|
| 9,372,577 | B2 | 6/2016 | Zafiris | |
| 2011/0181523 | A1* | 7/2011 | Grothe | G06F 11/1633 345/173 |
| 2014/0132556 | A1* | 5/2014 | Huang | G06F 3/0446 345/174 |
| 2015/0091587 | A1* | 4/2015 | Shepelev | G06F 3/041662 324/658 |
| 2019/0286321 | A1 | 9/2019 | Kim et al. | |
| 2021/0026587 | A1* | 1/2021 | Christiansson | G06F 9/451 |
| 2021/0173523 | A1* | 6/2021 | Lee | G06F 3/05 |
| 2022/0268919 | A1* | 8/2022 | Kurniawan | G01S 13/42 |
| 2022/0317854 | A1* | 10/2022 | Lee | G06F 3/04184 |
| 2024/0402847 | A1* | 12/2024 | Nomura | G06F 3/04166 |

FOREIGN PATENT DOCUMENTS

| | | |
|---|---|---|
| KR | 10-2018-0014644 A | 2/2018 |

* cited by examiner

*Primary Examiner* — Md Saiful A Siddiqui
(74) *Attorney, Agent, or Firm* — Innovation Counsel LLP

(57) ABSTRACT

Disclosed is an electronic device which include a sensor layer that includes a plurality of sensing electrodes, and a sensor driving unit that drives the sensor layer in units of sensing frame. The sensing frame includes a first sensing frame including a first scan section and a first processing section and a second sensing frame including a second scan section and a second processing section. The sensor driving unit generates first coordinate information during the first scan section, stores the first coordinate information during the first processing section, generates second coordinate information during the second scan section, and stores the second coordinate information during the second processing section and determines whether the first coordinate information and the second coordinate information coincide with each other.

14 Claims, 15 Drawing Sheets

ELECTRONIC DEVICE AND DRIVING METHOD THEREOF

CROSS-REFERENCE TO RELATED APPLICATIONS

This application claims priority under 35 U.S.C. § 119 to Korean Patent Application No. 10-2024-0046121 filed on Apr. 4, 2024, in the Korean Intellectual Property Office, the disclosures of which are incorporated by reference herein in their entireties.

BACKGROUND

Embodiments of the present disclosure described herein relate to an electronic device with improved sensing reliability.

An electronic device includes a display layer displaying an image, a display driving unit transmitting a signal to the display layer, a sensor layer located on the display layer, and a sensor driving unit transmitting a driving signal to the sensor layer.

The sensor layer which is a kind of information input device may be provided and used in the electronic device. As an example, the sensor layer may be attached on one surface of the display layer or may be integrally manufactured with the display layer. The user may input information by pushing or touching the sensor layer while viewing an image displayed on a screen of the electronic device.

SUMMARY

Embodiments of the present disclosure provide an electronic device with improved sensing reliability.

According to an embodiment, an electronic device may include a sensor layer that includes a plurality of sensing electrodes, and a sensor driving unit that drives the sensor layer in units of sensing frame. The sensing frame may include a first sensing frame that includes a first scan section and a first processing section, and a second sensing frame following the first sensing frame and includes a second scan section and a second processing section. The sensor driving unit may generate first coordinate information during the first scan section, may store the first coordinate information during the first processing section, may generate second coordinate information during the second scan section, may store the second coordinate information during the second processing section, and may determine whether the first coordinate information and the second coordinate information coincide with each other by comparing the first coordinate information and the second coordinate information.

The first coordinate information may include a first coordinate value, and the second coordinate information may include a second coordinate value.

The electronic device may further include a processor that drives the sensor driving unit. When the first coordinate value and the second coordinate value coincide with each other, the sensor driving unit is configured to transmit a start signal activated and the second coordinate information after the second sensing frame.

When the start signal is activated, the processor may receive the second coordinate information.

The sensing frame may further include a third sensing frame following the second sensing frame. When the first coordinate value and the second coordinate value are different from each other, the sensor driving unit may generate third coordinate information having a third coordinate value during the third sensing frame.

The sensor driving unit may transmit the start signal activated and the third coordinate information after the third sensing frame.

The sensor driving unit may apply more driving signals to the plurality of sensing electrodes in the second scan section than those in the first scan section.

The sensor driving unit may receive sensing signals respectively corresponding to the driving signals from the plurality of sensing electrodes.

The plurality of sensing electrodes may include a plurality of first sensing electrodes each extending in a first direction, and a plurality of second sensing electrodes each extending in a second direction intersecting the first direction.

The first coordinate information may include (1-1)-th information about one selected from the plurality of first sensing electrodes and (1-2)-th information about one selected from the plurality of second sensing electrodes. The second coordinate information may include a (2-1)-th information about one selected from the plurality of first sensing electrodes and (2-2)-th information about one selected from the plurality of second sensing electrodes.

The sensor driving unit may determine whether the (1-1)-th information and the (2-1)-th information coincide with each other by comparing the (1-1)-th information and the (2-1)-th information during the second sensing frame and may determine whether the (1-2)-th information and the (2-2)-th information coincide with each other by comparing the (1-2)-th information and the (2-2)-th information during the second sensing frame.

The electronic device may further include a processor that drives the sensor driving unit. When the (1-1)-th information and the (2-1)-th information coincide with each other and the (1-2)-th information and the (2-2)-th information coincide with each other, the sensor driving unit may transmit a start signal activated and the second coordinate information after the second sensing frame.

The sensing frame may further include a third sensing frame following the second sensing frame. When the (1-1)-th information and the (2-1)-th information are different from each other or when the (1-2)-th information and the (2-2)-th information are different from each other, the sensor driving unit may generate third coordinate information during the third sensing frame.

The sensor driving unit transmits the start signal activated and the third coordinate information after the third sensing frame.

According to an embodiment, a driving method of an electronic device may include providing a sensor layer including a plurality of sensing electrodes, a sensor driving unit driving the sensor layer by a sensing frame unit including a first sensing frame including a first scan section and a first processing section and a second sensing frame following the first sensing frame and including a second scan section and a second processing section, and a processor driving the sensor driving unit, generating first coordinate information during the first scan section, storing the first coordinate information during the first processing section, generating second coordinate information during the second scan section, storing the second coordinate information during the second processing section, and determining whether the first coordinate information and the second coordinate information coincide with each other, by comparing the first coordinate information and the second coordinate information during the second processing section.

The first coordinate information may include a first coordinate value, the second coordinate information may include a second coordinate value, and the method may further include, transmitting, a start signal activated after the second sensing frame from the sensor driving unit to the processor when the first coordinate value and the second coordinate value coincide with each other.

Receiving, by the processor, the second coordinate information is performed after the transmitting of the activated start signal to the processor.

The sensing frame may further include a third sensing frame following the second sensing frame, and the method may further include generating by the plurality of sensing electrodes and storing by the sensor driving unit third coordinate information having a third coordinate value during the third sensing frame when the first coordinate value and the second coordinate value are different from each other.

The method may further include transmitting the start signal activated after the third sensing frame from the sensor driving unit to the processor.

Receiving, by the processor, the third coordinate information may be performed after the transmitting of the activated start signal to the processor.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
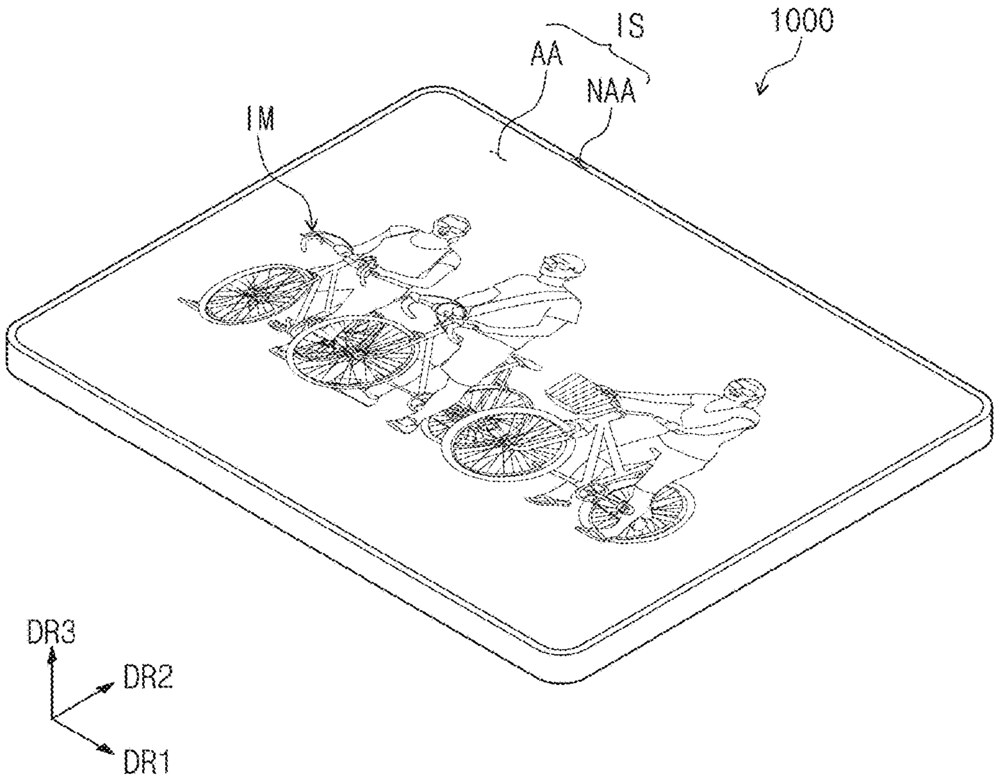
FIG. 1 is a perspective view of an electronic device according to an embodiment of the present disclosure.

In the specification, the expression that a first component (or an area, a layer, a part, or a portion) is "on", "connected to", or "coupled to" a second component means that the first component is directly on/connected to/coupled to the second component or means that a third component is interposed therebetween.

The same reference numerals/signs refer to the same components. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the inventive concept, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

FIG. 1 is a perspective view of an electronic device according to an embodiment of the present disclosure.

Referring to FIG. 1, an electronic device 1000 may be a device which is activated depending on an electrical signal. The electronic device 1000 according to the present disclosure may be a small and medium-sized electronic device such as a mobile phone, a tablet, a notebook, an automotive navigation system, an automotive display panel, or a game console, as well as a large-sized electronic device such as a television or a monitor. The above electronic devices are provided only as an example, and it is obvious that the electronic device 1000 may be implemented with any other electronic device(s) unless departing from the concept of the inventive concept. The electronic device 1000 has a rectangle shape having a long edge in a first direction DR1 and a short edge in a second direction DR2 intersecting the first direction DR1. However, the shape of the electronic device 1000 is not limited thereto. For example, the electronic device 1000 may be implemented in various shapes. The electronic device 1000 may display an image IM on a display surface IS defined by the first direction DR1 and the second direction DR2 facing a third direction DR3. The display surface IS on which the image IM is displayed may correspond to a front surface of the electronic device 1000.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the electronic device 1000 in the third direction DR3. Meanwhile, directions which the first to third directions DR1, DR2, and DR3 indicate may be relative in concept and may be changed to different directions.

The electronic device 1000 may sense an external input applied from the outside. The external input may include various types of inputs which are provided from the outside of the electronic device 1000. The electronic device 1000 according to an embodiment of the present disclosure may sense an external input of the user, which is applied from the outside. The external input of the user may be one of various types of external inputs such as a part of his/her body, a light, heat, his/her eye, or pressure or a combination thereof. Also, the electronic device 1000 may sense the external input of the user which is applied to the side surface or rear surface of the electronic device 1000 depending on a structure of the electronic device 1000, and is not limited to any one embodiment.

The display surface IS of the electronic device 1000 may include an active area AA and a non-active area NAA. The active area AA may refer to an area in which the image IM is displayed. The user visually perceives the image IM through the active area AA. In an embodiment, the active area AA is illustrated in the shape of a quadrangle whose vertexes are rounded. However, this is illustrated as an example. The active area AA may be implemented in various shapes and may not be limited to any one embodiment.

The non-active area NAA is disposed adjacent to the active area AA. The non-active area NAA may have a given color. The non-active area NAA may surround the active area AA. Accordingly, the shape of the active area AA may be defined substantially by the non-active area NAA. However, this is illustrated as an example. For example, the non-active area NAA may be only disposed adjacent to one side of the active area AA or may be omitted. The electronic device 1000 according to an embodiment of the present disclosure may include various embodiments and is not limited to any one embodiment.

Figure 2:
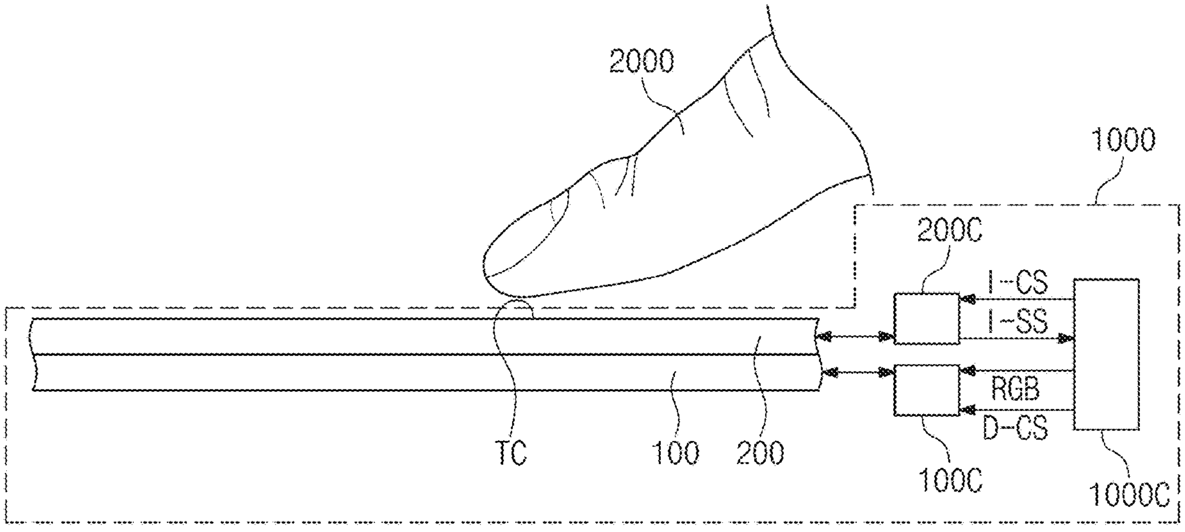
FIG. 2 is a block diagram illustrating an electronic device according to an embodiment of the present disclosure and a body of a user.

FIG. 2 is a block diagram illustrating an electronic device according to an embodiment of the present disclosure and a body of a user.

Referring to FIG. 2, the electronic device 1000 may include a display layer 100, a sensor layer 200, a display driving unit 100C, a sensor driving unit 200C, and a processor 1000C.

The display layer 100 may be a component which substantially generates an image. The display layer 100 may be a light emitting display layer. For example, the display layer 100 may be an organic light emitting display layer, a quantum dot display layer, a micro-LED display layer, or a nano-LED display layer.

The sensor layer 200 may be disposed on the display layer 100. The sensor layer 200 may sense an external input applied from the outside, the sensor layer 200 may sense a touch input TC by a body 2000 of the user.

The processor 1000C may control all the operations of the electronic device 1000. For example, the processor 1000C may control operations of the display driving unit 100C and the sensor driving unit 200C. The processor 1000C may include at least one microprocessor, and the processor 1000C may be referred to as a "host".

The display driving unit 100C may control the display layer 100. The processor 1000C may further include a graphics controller. The display driving unit 100C may receive image data RGB and a control signal D-CS from the processor 1000C. The control signal D-CS may include various signals. For example, the control signal D-CS may include an input vertical synchronization signal, an input horizontal synchronization signal, a main clock, a data enable signal, etc. The display driving unit 100C may generate a vertical synchronization signal and a horizontal synchronization signal for controlling the timing to provide a signal to the display layer 100 based on the control signal D-CS.

The sensor driving unit 200C may control the sensor layer 200. The sensor driving unit 200C may receive a touch control signal I-CS from the processor 1000C. The touch control signal I-CS may include a mode decision signal for determining a driving mode of the sensor driving unit 200C and a clock signal, the sensor driving unit 200C may operate in a mode of sensing the touch input TC by the body 2000 of the user based on the touch control signal I-CS.

The sensor driving unit 200C may calculate coordinate information of the touch input TC based on the signal received from the sensor layer 200 and may provide a coordinate signal I-SS including the coordinate information to the processor 1000C.

The sensor driving unit 200C and the processor 1000C may be connected to each other through inter integrated circuit ($I^2C$) communication or serial peripheral interface (SPI) communication.

The processor 1000C performs an operation corresponding to the user input based on the coordinate signal I-SS. For example, the processor 1000C may control the display driving unit 100C based on the coordinate signal I-SS such that a new application image is displayed through the display layer 100. The coordinate signal I-SS may include a start signal INT (refer to FIG. 9) and coordinate information DATA (refer to FIG. 9).

Figure 3A:
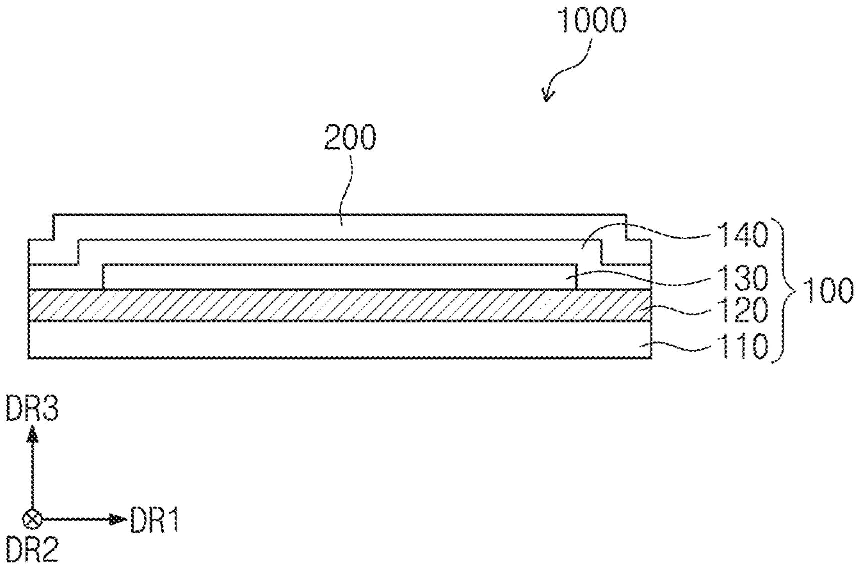
FIG. 3A is a cross-sectional view of an electronic device according to an embodiment of the present disclosure.

FIG. 3A is a cross-sectional view of an electronic device according to an embodiment of the present disclosure.

Referring to FIG. 3A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member which provides a base surface on which the circuit layer 120 is disposed. The base layer 110 may be a glass substrate, a metal substrate, or a polymer substrate. However, an embodiment is not limited thereto. For example, the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. Meanwhile, in the specification, the wording "~~-based resin" indicates that "~~-based resin" includes the functional group of "~~".

The circuit layer 120 may be disposed on the base layer 110. The circuit layer 120 may include an insulating layer, a semiconductor pattern, a conductive pattern, a signal line, etc. An insulating layer, a semiconductor layer, and a conductive layer may be formed on the base layer 110 through a coating or deposition process, and the insulating layer, the semiconductor layer, and the conductive layer may be selectively patterned through a plurality of photolithography processes. Afterwards, the insulating layer, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as moisture, oxygen, and dust particles.

The sensor layer 200 may be formed on the display layer 100 through the same process as the display layer 100. In this case, the sensor layer 200 may be expressed as being directly disposed on the display layer 100. The expression "being directly disposed" may indicate that a third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a typical adhesive or sticking agent.

Figure 3B:
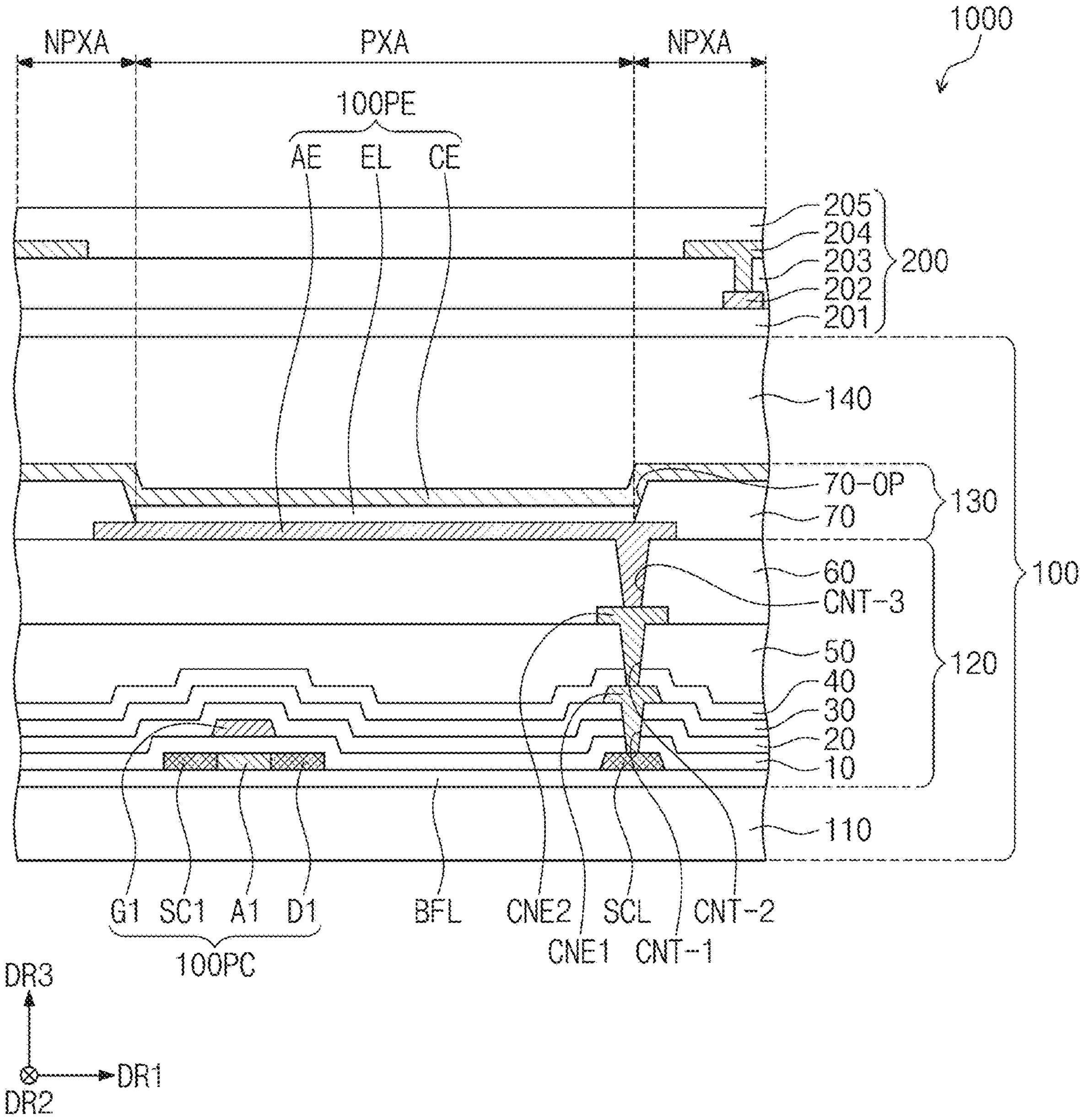
FIG. 3B is a cross-sectional view of an electronic device according to an embodiment of the present disclosure.

FIG. 3B is a cross-sectional view of an electronic device according to an embodiment of the present disclosure. In the description of FIG. 3B, the components which are described with reference to FIG. 3A are marked by the same reference numerals/signs, and thus, additional description will be omitted to avoid redundancy.

Referring to FIG. 3B, at least one inorganic layer may be formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may improve a bonding force between the base layer 110 and a semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may include polysilicon. However, the present disclosure is not limited thereto. For example, the semiconductor pattern may include amorphous silicon, low-temperature polycrystalline silicon, or oxide semiconductor.

FIG. 3B only shows a portion of the semiconductor pattern, and the semiconductor pattern may be further disposed in another area. Semiconductor patterns may be arranged across pixels in a specific configuration. An electrical property of the semiconductor pattern may vary depending on whether it is doped or not. The semiconductor pattern may include a first area having higher conductivity and a second area having lower conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than that of the first area.

A conductivity of the first area may be greater than a conductivity of the second area and may serve as an electrode or a signal line. The second area may correspond to an active (or channel) of a transistor. In other words, a portion of the semiconductor pattern may be an active of a transistor, another portion thereof may be a source or a drain of the transistor, and the other portion thereof may be a connection electrode or a connection signal line.

Each of pixels may have 7 transistors, one capacitor, and one light emitting element, and the each of the pixel circuit may be modified in various forms. One transistor 100PC and one light emitting element 100PE which are included in one pixel are illustrated in FIG. 3B as an example.

The transistor 100PC may include a source SC1, an active A1, a drain D1, and a gate G1. The source SC1, the active A1, and the drain D1 may be formed of the semiconductor pattern. In a cross-sectional view, the source SC1 and the drain D1 may extend from the active A1 in directions facing away from each other. A portion of a connection signal line SCL formed of the semiconductor pattern is illustrated in FIG. 3B. Although not separately illustrated, in a plan view, the connection signal line SCL may be electrically connected to the drain D1 of the transistor 100PC.

A first insulating layer 10 may be disposed on the buffer layer BFL. The first insulating layer 10 may be disposed in a plurality of pixels in common and may cover the semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. Not only the first insulating layer 10 but also an insulating layer of the circuit layer 120 to be described later may be an inorganic layer and/or an organic layer, and may have a single-layer structure or a multi-layer structure. The inorganic layer may include at least one of the above-described materials, but the present disclosure is not limited thereto.

A gate G1 is disposed on the first insulating layer 10. The gate G1 may be a portion of a metal pattern. The gate G1 overlaps the active A1. The gate G1 may function as a self-aligned mask in the process of doping the semiconductor pattern.

The second insulating layer 20 may be disposed on the first insulating layer 10 and may cover the gate G1. The second insulating layer 20 may overlap the pixels in common. The second insulating layer 20 may be an inorganic layer and/or an organic layer and may have a single-layer or multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the first connection electrode CNE1 on third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may be an organic light emitting material, a quantum dot, a quantum rod, a micro-LED, or a nano LED. Hereinafter, the description will be given under the condition that the light emitting element 100PE is an organic light emitting element, but the present disclosure is not limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The active area AA (refer to FIG. 1) may include an emission area PXA and a non-emission area NPXA disposed adjacent to the emission area PXA. The non-emission area NPXA may completely surround the emission area PXA. In an embodiment, the emission area PXA is defined to correspond to a partial area of the first electrode AE exposed by the opening 70-OP.

The light emitting layer EL may be disposed on the first electrode AE. The light emitting layer EL may be disposed in the opening 70-OP. That is, the light emitting layer EL may be independently formed for each pixel. When the light emitting layer EL is independently formed for each pixel, each of the light emitting layers EL may emit a light of at least one of a blue color, a red color, and a green color. However, the present disclosure is not limited thereto. For example, the light emitting layer EL may be connected to the pixels in common. In this case, the light emitting layer EL may provide a blue light or may provide a white light.

The second electrode CE may be disposed on the light emitting layer EL. The second electrode CE may have an integrated shape and may be disposed in the plurality pixels in common.

Although not illustrated, a hole control layer may be disposed between the first electrode AE and the light emitting layer EL. The hole control layer may be disposed in common in the light emitting area PXA and the non-emission area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be formed in the plurality of pixels in common by using an open mask.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the present disclosure is not limited thereto.

The sensor layer 200 may be formed on the display layer 100 through the same process as the display layer 100. In this case, the sensor layer 200 may be expressed as being directly disposed on the display layer 100. The expression "being directly disposed" may indicate that a third component is not interposed between the sensor layer 200 and the display layer 100. That is, a separate adhesive member may not be interposed between the sensor layer 200 and the display layer 100. Alternatively, the sensor layer 200 may be bonded to the display layer 100 through an adhesive member. The adhesive member may include a typical adhesive or sticking agent.

The sensor layer 200 may include a base insulating layer 201, a first conductive layer 202, a sensing insulating layer 203, a second conductive layer 204, and a cover insulating layer 205.

The base insulating layer 201 may be an inorganic layer including at least one of silicon nitride, silicon oxynitride, and silicon oxide. Alternatively, the base insulating layer 201 may be an organic layer including an epoxy resin, an acrylic resin, or an imide-based resin. The base insulating layer 201 may have a single-layer structure or may be a structure in which a plurality of layers are stacked along the third direction DR3.

Each of the first conductive layer 202 and the second conductive layer 204 may have a single-layer structure or may have a structure in which a plurality of layers are stacked in the third direction DR3.

A conductive layer of a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, graphene, etc.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of acrylic-based resin, methacrylic-based resin, polyisoprene, vinyl-based resin, epoxy-based resin, urethane-based resin, cellulose-based resin, siloxane-based resin, polyimide-based resin, polyamide-based resin, and perylene-based resin.

Figure 4:
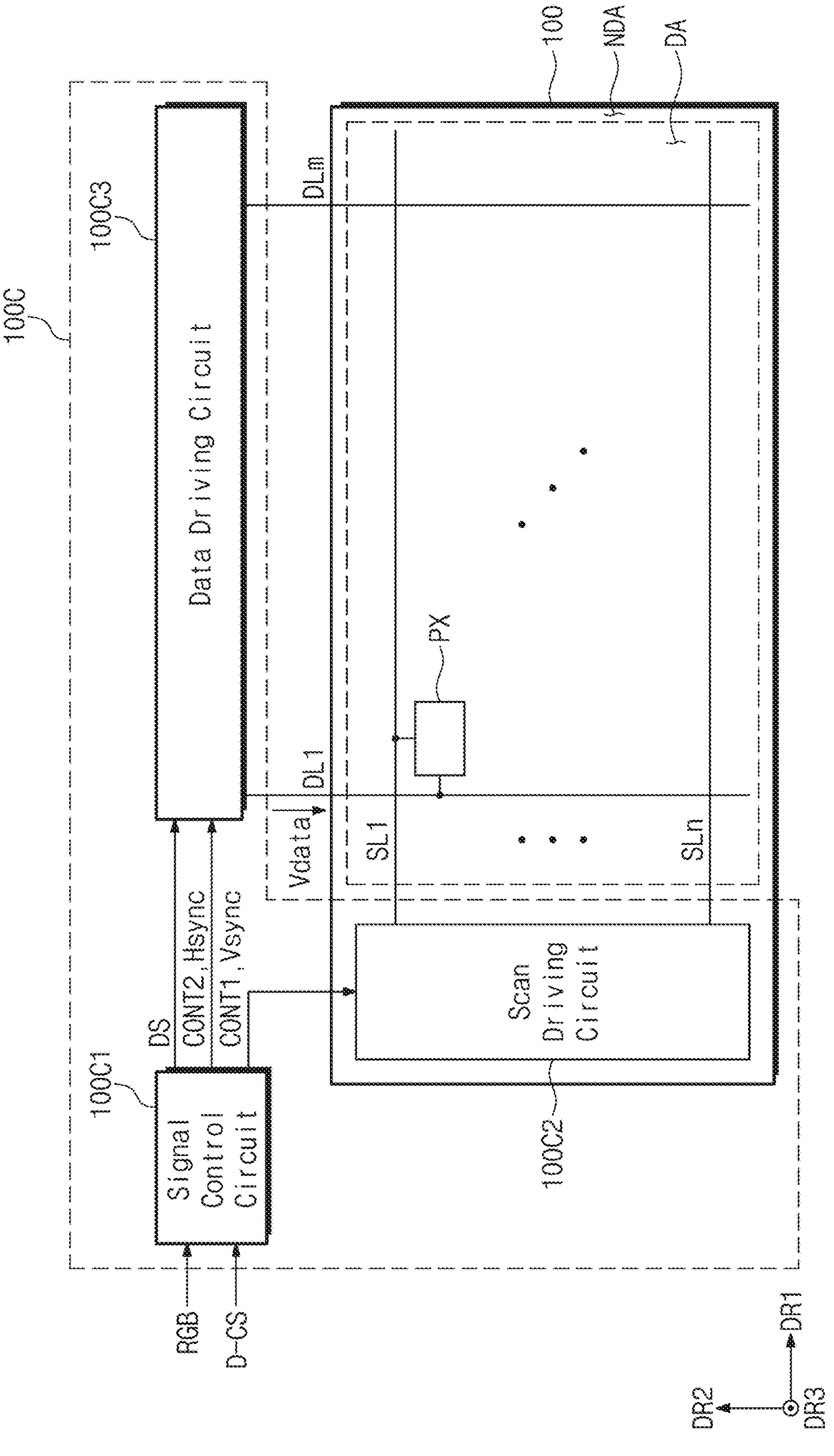
FIG. 4 is a block diagram of a display layer and a display driving unit according to an embodiment of the present disclosure.

FIG. 4 is a block diagram of a display layer and a display driving unit according to an embodiment of the present disclosure.

Referring to FIG. 4, the display layer 100 may include a plurality of scan lines SL1 to SLn, a plurality of data lines DL1 to DLm, and a plurality of pixels PX. Each of the plurality of pixels PX may be connected to a corresponding data line among the plurality of data lines DL1 to DLm and may be connected to a corresponding scan line among the plurality of scan lines SL1 to SLn. In an embodiment of the present disclosure, the display layer 100 may further include emission control lines, and the display driving unit 100C may further include an emission driving circuit which provides control signals to the emission control lines. A configuration of the display layer 100 is not particularly limited.

The display layer 100 may include a display area DA and a non-display area NDA. The display area DA may be defined as an area in which the image IM (refer to FIG. 1) is displayed (i.e., an area in which an image is displayed). According to an embodiment, the display area DA may correspond to (or overlap) at least a portion of the active area AA (refer to FIG. 1).

The non-display area NDA is disposed adjacent to the display area DA. The non-display area NDA may be an area where the image IM (refer to FIG. 1) is not substantially displayed. For example, the non-display area NDA may completely surround the display area DA. However, this is illustrated as an example, and the non-display area NDA may be defined in various shapes without limitation to any one embodiment.

The display driving unit 100C may include a signal control circuit 100C1, a scan driving circuit 100C2, and a data driving circuit 100C3.

The signal control circuit 100C1 may receive the image data RGB and the control signal D-CS from the processor 1000C (refer to FIG. 2). The control signal D-CS may include various signals. For example, the control signal D-CS may include an input vertical synchronization signal, an input horizontal synchronization signal, a main clock, a data enable signal, etc.

The signal control circuit 100C1 may generate a first control signal CONT1 and a vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and a horizontal synchronization signal Hsync based on the control signal D-CS and may output the second control signal CONT2 and the horizontal synchronization signal Hsync to the data driving circuit 100C3. The horizontal synchronization signal Hsync may be included in the second control signal CONT2.

Also, the signal control circuit 100C1 may output a data signal DS, which is obtained by processing the image data RGB to satisfy an operating condition of the display layer 100 to the data driving circuit 100C3. The first control signal CONT1 and the second control signal CONT2 which are signals necessary for the operations of the scan driving circuit 100C2 and the data driving circuit 100C3 are not particularly limited.

The scan driving circuit 100C2 may drive the plurality of scan lines SL1 to SLn in response to the first control signal CONT1 and the vertical synchronization signal Vsync. In an embodiment of the present disclosure, the scan driving circuit 100C2 may be formed in the same process as the circuit layer 120 (refer to FIG. 3B) in the display layer 100, but the present disclosure is not limited thereto. For example, the scan driving circuit 100C2 may be implemented with an integrated circuit (IC) and directly connected to the display layer 100 or may be mounted on a separate printed circuit board in a chip-on-film (COF) manner and connected to the display layer 100.

The data driving circuit 100C3 may output data grayscale voltages Vdata for driving the plurality of data lines DL1 to DLm in response to the second control signal CONT2, the horizontal synchronization signal Hsync, and the driving signal DS from the signal control circuit 100C1. The data driving circuit 100C3 may be implemented with an integrated circuit and directly connected to the display layer 100, or may be mount on a separate printed circuit board in the chip-on-film manner and connected to the display layer 100. However, the present disclosure is not limited thereto. For example, the data driving circuit 100C3 may be formed in the same process as the circuit layer 120 (refer to FIG. 3B) in the display layer 100.

Figure 5:
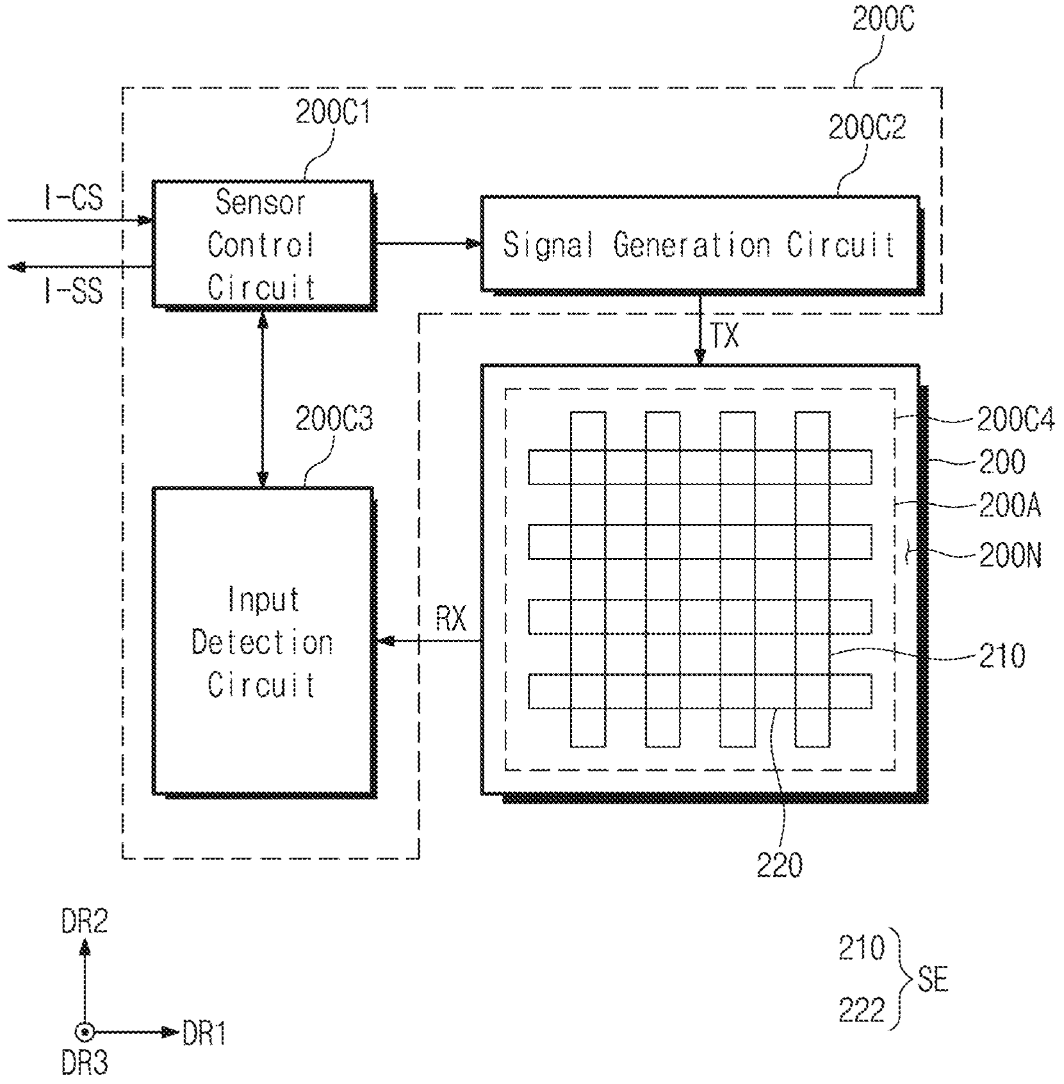
FIG. 5 is a block diagram of a sensor layer and a sensor driving unit according to an embodiment of the present disclosure.

FIG. 5 is a block diagram of a sensor layer and a sensor driving unit according to an embodiment of the present disclosure.

Referring to FIG. 5, an active area 200A and a surrounding area 200N may be defined in the sensor layer 200. The active area 200A may be an area which is activated in response to an electrical signal. For example, the active area 200A may be an area in which an input is sensed. The active area 200A may overlap the active area AA (refer to FIG. 1) of the electronic device 1000 (refer to FIG. 1). The surrounding area 200N may completely surround the active area 200A. The surrounding area 200N may overlap the non-active area NAA (refer to FIG. 1) of the electronic device 1000 (refer to FIG. 1).

The sensor layer 200 may include a sensing electrode SE. The sensing electrode SE may be disposed in the active area 200A. The sensing electrode SE may be provided in plurality, and the plurality of sensing electrodes SE may include a plurality of first sensing electrodes 210 and a plurality of second sensing electrodes 220. Each of the plurality of first sensing electrodes 210 may extend in the second direction DR2, and the plurality of first sensing electrodes 210 may be arranged to be spaced apart from each other in the first direction DR1. Each of the plurality of second sensing electrodes 220 may extend in the first direction DR1, and the plurality of second sensing electrodes 220 may be arranged to be spaced apart from each other in the second direction DR2.

The plurality of second sense electrodes 220 may intersect the plurality of first sensing electrodes 210 and may be insulated from the plurality of first sensing electrodes 210.

The sensor driving unit 200C may receive the touch control signal I-CS from the processor 1000C (refer to FIG. 2) and may provide the coordinate signal I-SS to the processor 1000C (refer to FIG. 2).

The sensor driving unit 200C may include a sensor control circuit 200C1, a signal generation circuit 200C2, and an input detection circuit 200C3. The sensor control circuit 200C1, the signal generation circuit 200C2, and the input detection circuit 200C3 may be implemented in a single chip. Alternatively, some of the sensor control circuit 200C1, the signal generation circuit 200C2, and the input detection circuit 200C3 and the other(s) thereof may be implemented in different chips from each other.

The sensor control circuit 200C1 may control the operation of the signal generation circuit 200C2, and the signal generation circuit 200C2 may calculate coordinates of an external input from a sensing signal received from the input detection circuit 200C3 or may analyze information transmitted from an external device using a modulation signal received from the input detection circuit 200C3.

The signal generation circuit 200C2 may provide a driving signal (or output signal) TX to the sensor layer 200. The signal generation circuit 200C2 may output the driving signal TX during a sensing frame to the sensor layer 200.

The input detection circuit 200C3 may receive a sensing signal RX from the sensor layer 200. The sensing signal RX may be an analog signal. The input detection circuit 200C3 may amplify and filter the received analog signal. Afterward, the input detection circuit 200C3 may convert the filtered signal into a digital signal.

Figure 6:
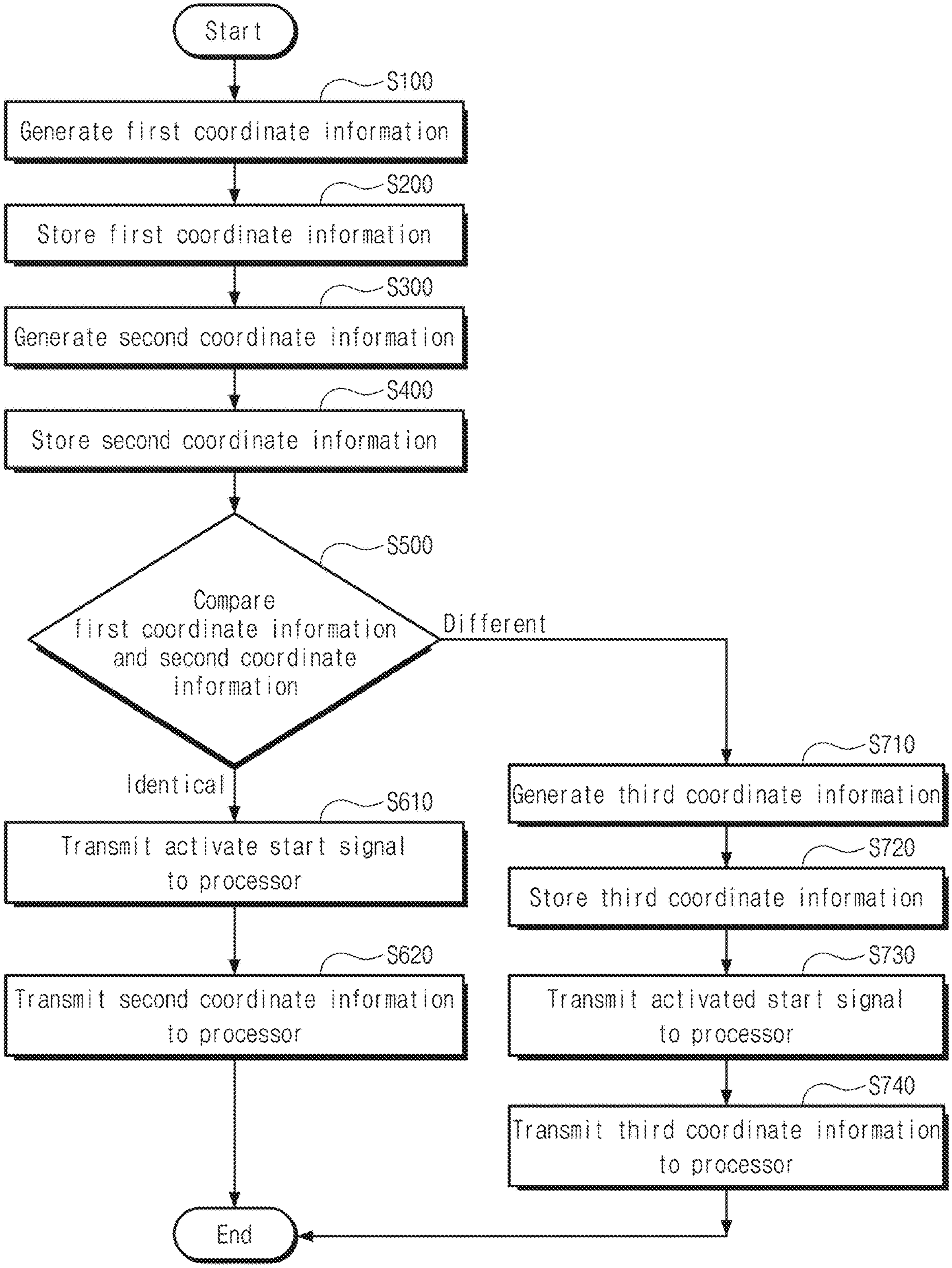
FIG. 6 is a flowchart of a driving method of an electronic device according to an embodiment of the present disclosure.

FIG. 6 is a flowchart of a driving method of an electronic device according to an embodiment of the present disclosure.

Referring to FIGS. 2 and 6, a driving method of an electronic device according to an embodiment of the present disclosure may include generating first coordinate information CD1 at the sensor driving unit 200C (refer to FIG. 7) (S100), storing the first coordinate information CD1 at the sensor driving unit 200C (refer to FIG. 7) (S200), generating second coordinate information CD2 at the sensor driving unit 200C (refer to FIG. 7) (S300), storing the second coordinate information CD2 at the sensor driving unit 200C (refer to FIG. 7) (S400), and comparing the first coordinate information CD1 (refer to FIG. 7) and the second coordinate information CD2 at the sensor driving unit 200C (refer to FIG. 7) (S500).

The first coordinate information CD1 (refer to FIG. 7) may include a first coordinate value and the second coordinate information CD2 (refer to FIG. 7) may include a second coordinate value. When the first coordinate value is the same as the second coordinate value, transmitting an activated start signal to the processor 1000C from the sensor driving unit 200C may be performed (S610). Transmitting the second coordinate information (S620) to the processor 1000C may be performed after the transmitting (S610) of the activated start signal to the processor 1000C.

When the first coordinate value is different from the second coordinate value, generating third coordinate information having a third coordinate value may further be performed at the sensor driving unit 200C (S710). Storing the third coordinate information at the sensor driving unit 200C (S720) may be performed after the generating (S710) of the third coordinate information. Transmitting the activated start signal to the processor 1000C from the sensor driving unit 200C (S730) may be further performed after the storing (S720) of the third coordinate information. Transmitting the third coordinate information (S740) to the processor 1000C may be further performed after the transmitting (S730) of the activated start signal.

Figure 7:
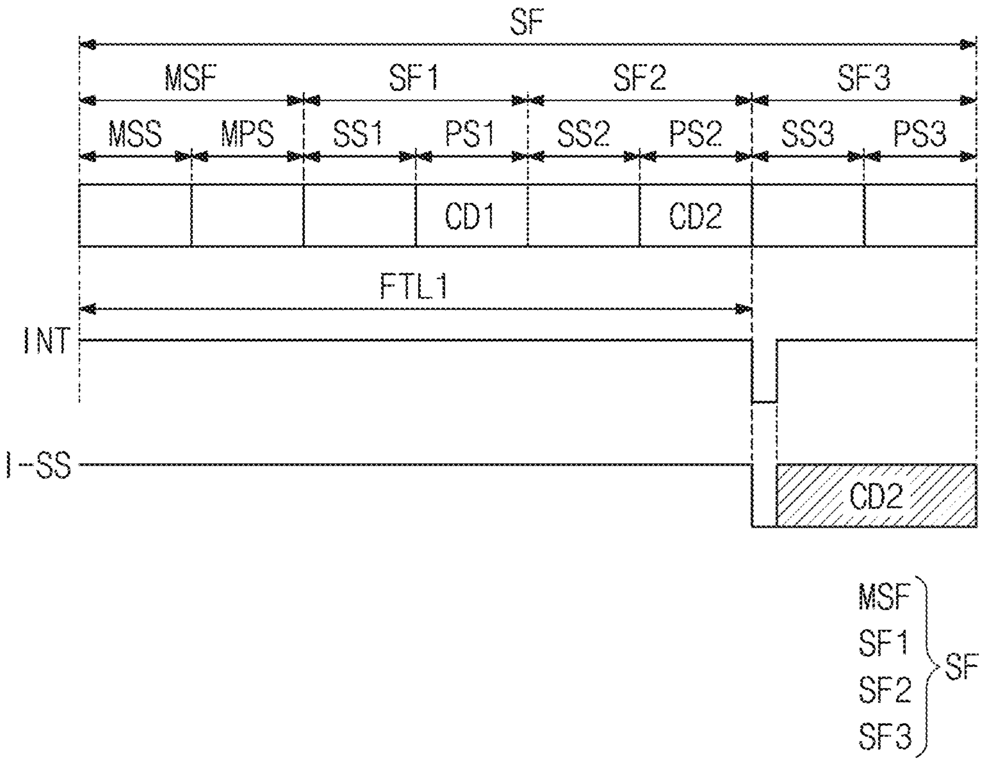
FIG. 7 is a diagram for describing how to drive an electronic device according to an embodiment of the present disclosure.
Figure 8A:
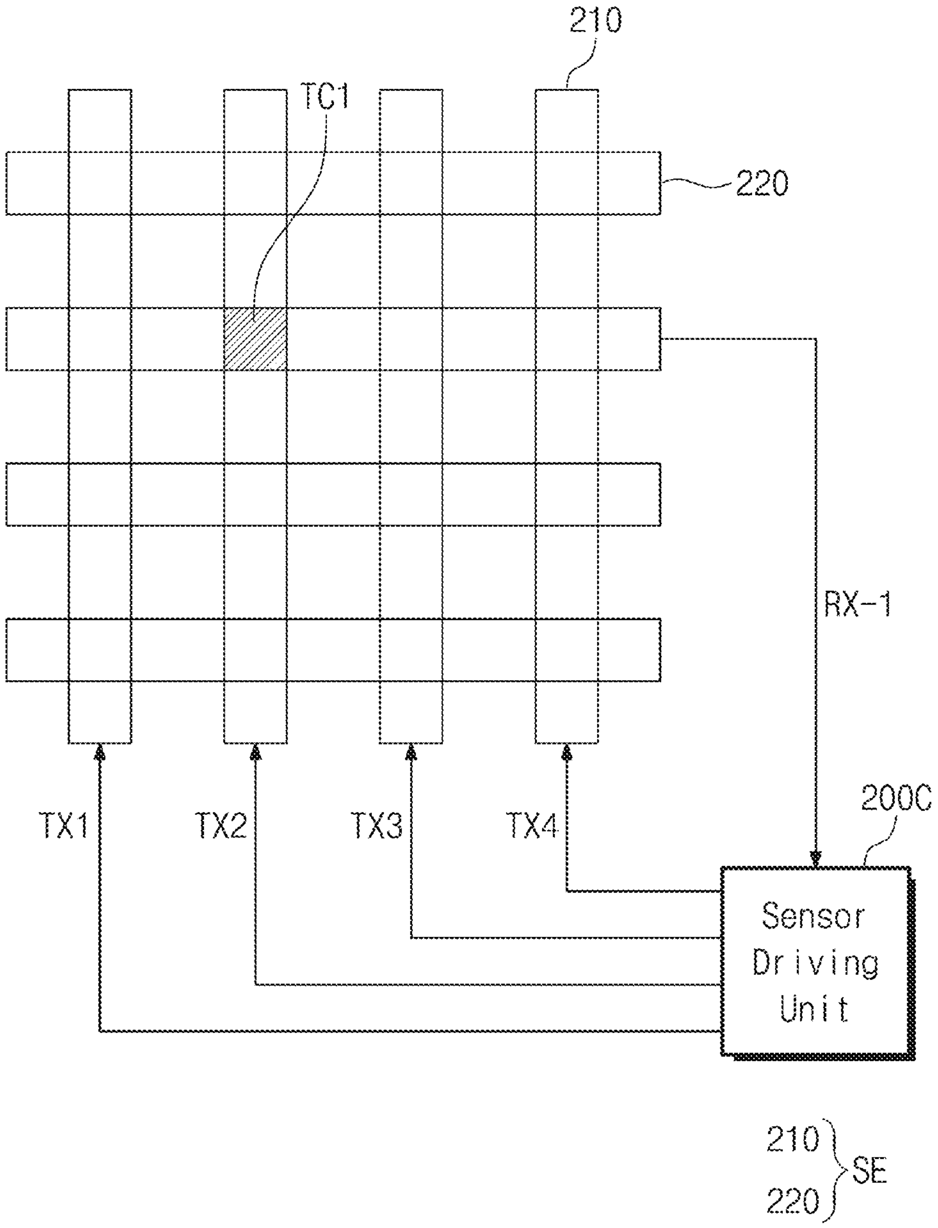
FIGS. 8A and 8B are diagrams for describing a sensor layer and a sensor driving unit according to an embodiment of the present disclosure.
Figure 8B:
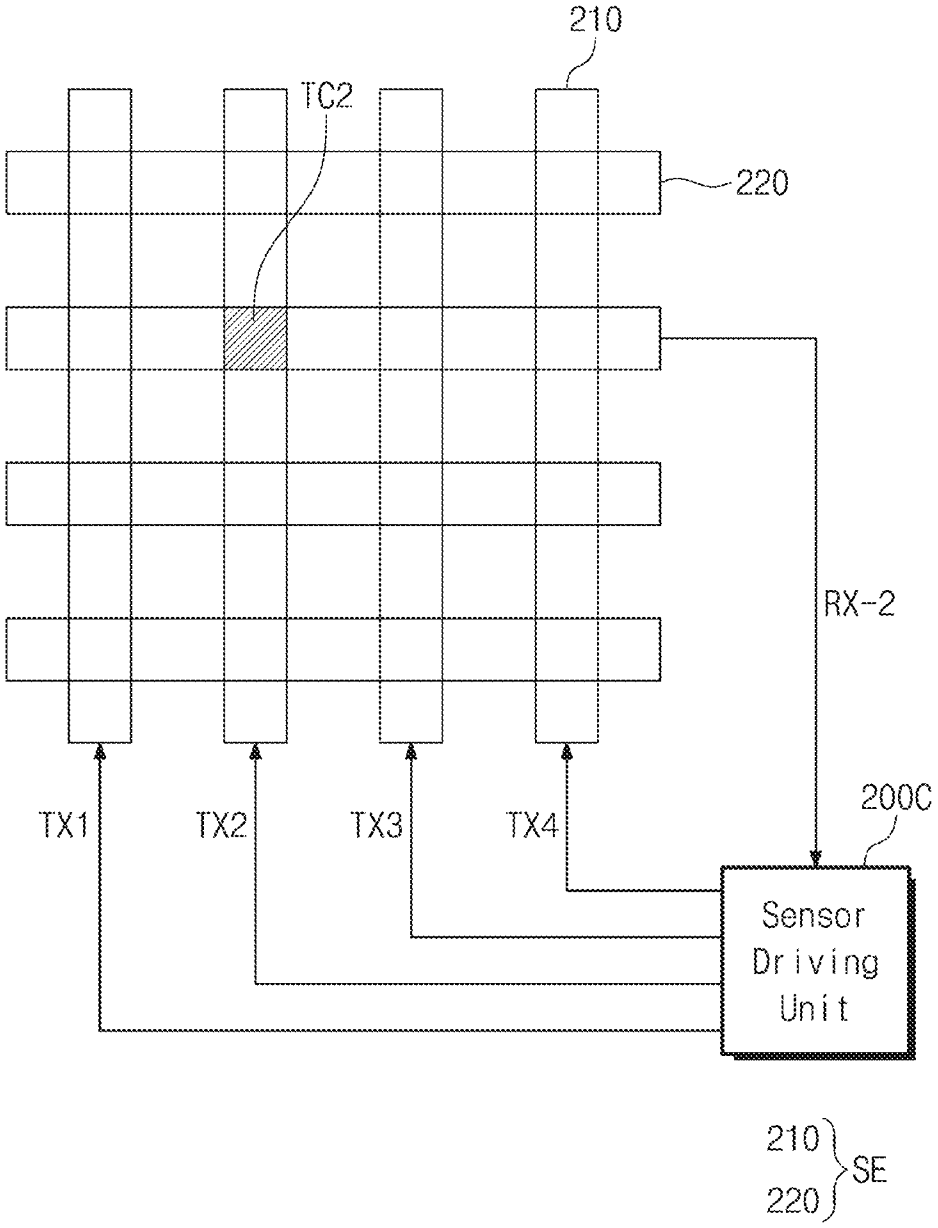

FIG. 7 is a diagram for describing how to drive an electronic device according to an embodiment of the present disclosure. FIGS. 8A and 8B are diagrams for describing a sensor layer and a sensor driving unit according to an embodiment of the present disclosure.

Referring to FIGS. 2, 5, and 7 to 8B, to sense the touch input TC, the sensor driving unit 200C may drive the sensor layer 200 in units of sensing frame SF. The driving frequency of the sensing frame SF may be 120 hertz (Hz). That is, the period of the sensing frame SF may be 8.3 milliseconds (ms). However, this is an example, and the driving frequency of the sensor frame SF according to an embodiment of the present disclosure is not limited thereto. The sensing frame SF may include an initial frame MSF, a first sensing frame SF1, a second sensing frame SF2, and a third sensing frame SF3.

The touch input TC may include a first touch input TC1 and a second touch input TC2. The first touch input TC1 may be the touch input TC sensed during the first sensing frame SF1, and the second touch input TC2 may be the touch input TC sensed during the second sensing frame SF2.

The initial frame MSF may include an initial scan section MSS and an initial processing section MPS. The touch input TC may be applied to the sensor layer 200 in the initial frame MSF. Because the touch input TC is applied to the sensor layer 200 in the initial frame MSF, the sensor driving unit 200C may be incapable of sensing the touch input TC during the initial scan section MSS. The sensor driving unit 200C may be incapable of processing coordinate information about the touch input TC during the initial processing section MPS. In an embodiment of the present disclosure, the initial frame MSF may be omitted.

FIG. 8A shows operations of the sensor layer 200 and the sensor driving unit 200C in the first frame SF1, according to an embodiment of the present disclosure. After the initial frame MSF, the sensor driving unit 200C may operate the first frame SF1. In the first frame SF1, unlike the initial frame MSF, the touch input TC may be provided from a beginning of the first frame SF1. The touch input TC may include the first touch input TC1 and the second touch input TC2 following the first touch input TC1. The first touch input TC1 and the second touch input TC2 may be a same signal having different timing and locations in which the first touch input TC1 and the second touch input TC2 are applied may be substantially identical. The first touch input TC1 may be provided during the first frame SF1 and the second touch input TC2 may be provided during the second frame SF2.

The first frame SF1 may include a first scan section SS1 and a first processing section PS1. During the first scan section SS1, the sensor driving unit 200C may transmit a plurality of driving signals TX1, TX2, TX3, and TX4 to the plurality of sensing electrodes SE. In this case, the sensor driving unit 200C may transmit the plurality of driving signals TX1, TX2, TX3, and TX4 during the first scan section SS1 repeatedly by less than the given number of times.

A mode illustrated in FIG. 8A, that is, a mode where the plurality of driving signals TX1, TX2, TX3, and TX4 are provided to the plurality of first sensing electrodes 210 repeatedly by less than the given number of times may be referred to as an "idle scan mode". Even in the initial scan section MSS, the sensor driving unit 200C may operate in the idle scan mode.

When the plurality of sensing electrodes SE operate in the mutual capacitance manner, each of the plurality of second sensing electrodes 220 may output a sensing signal RX-1 corresponding to each of the plurality of driving signals TX1 to TX4 respectively input to the plurality of first sensing electrodes 210. Only one sensing signal corresponding to the first touch input TC1 is illustrated in FIG. 8A.

According to the present disclosure, the sensor driving unit 200C may operate in the idle scan mode until the touch input TC is detected. During the idle scan mode, the sensor driving unit 200C may provide the plurality of driving signals TX1, TX2, TX3, and TX4 by less than the given number of times. Until the touch input TC is sensed, the sensor driving unit 200C may perform a minimum driving operation capable of determining the presence or absence of the touch input TC, and thus, the power consumption of the sensor driving unit 200C may be reduced.

The sensor driving unit 200C may generate the first coordinate information CD1 of the first touch input TC1 during the first processing section based on the sensing signal RX-1 applied during the first scan section SS1 and may store the first coordinate information CD1 during the first processing section PS1. The first coordinate information CD1 may be stored in a memory disposed in the sensor driving unit 200C. The first coordinates information CD1 may include a first coordinate value. The first coordinate value may be expressed by the coordinate system. For example, the first coordinate value may be expressed in the form of (x, y), where x indicating an x value corresponding to a first axis extending in the first direction DR1 and a y value corresponding to a second axis extending in the second direction DR2.

During the first sensing frame SF1, the sensor driving unit 200C may determine the presence or absence of the first touch input TC1 based on the first coordinate information CD1.

FIG. 8B shows operations of the sensor layer 200 and the sensor driving unit 200C in the second frame SF2 according to an embodiment of the present disclosure. After the first frame SF1, the sensor driving unit 200C may operate the second frame SF2. When the sensor driving unit 200C determines that the first touch input TC1 is made in a previous sensing frame, for example, in the first sensing frame SF1, the sensor driving unit 200C may switch a mode. For example, the sensor driving unit 200C may switch from the idle scan mode to an active scan mode, that is, may operate in the active scan mode. The second touch input TC2 may be provided during the second frame SF2.

The second frame SF2 may include a second scan section SS2 and a second processing section PS2. During the second scan section SS2, the sensor driving unit 200C may transmit the plurality of driving signals TX1, TX2, TX3, and TX4 to the plurality of sensing electrodes SE. In this case, the sensor driving unit 200C may transmit the plurality of driving signals TX1, TX2, TX3, and TX4 during the second scan section SS2 repeatedly by the given number of times or more.

A mode illustrated in FIG. 8B, that is, a mode where the plurality of driving signals TX1, TX2, TX3, and TX3 are provided to the plurality of first sensing electrodes 210 repeatedly by the given number of times or more may be referred to as the "active scan mode". That is, the plurality of driving signals TX1, TX2, TX3, and TX4 may be provided more in the active scan mode than in the idle scan mode. That is, the sensor driving unit 200C may apply more driving signals TX to the plurality of sensing electrodes SE in the second scan section SS2 than in the first scan section SS1.

When the plurality of sensing electrodes SE operate in the mutual capacitance manner, each of the plurality of second sensing electrodes 220 may output a sensing signal RX-2 corresponding to each of the plurality of touch driving signals TX1 to TX4 respectively input to the plurality of first sensing electrodes 210. Only one sensing signal corresponding to the second touch input TC2 is illustrated in FIG. 8B.

The sensor driving unit 200C may generate the second coordinate information CD2 of the second touch input TC2 during the second processing section PS2 based on the sensing signal RX-2 applied during the second scan section SS2 and may store the second coordinate information CD2 during the second processing section PS2. The second coordinate information CD2 may be stored in the memory disposed in the sensor driving unit 200C. The second coordinates information CD2 may include a second coordinate value. The second coordinate value may be expressed by the coordinate system.

According to the present disclosure, after the sensor driving unit 200C determines the presence or absence of the touch input TC, the sensor driving unit 200C may operate in the active scan mode. During the activate scan mode, the sensor driving unit 200C may provide the plurality of driving signals TX1, TX2, TX3, and TX4 by the given number of times or more. The sensor driving unit 200C may repeatedly receive the sensing signal RX-2 according to the plurality of driving signals TX1, TX2, TX3, and TX4 provided by the given number of times or more. The reliability of sensing may be improved by the sensing signal RX-2 repeated plural times. Accordingly, the accuracy of the second coordinate information CD2 may be improved. This may mean that the electronic device 1000 with improved touch reliability is provided.

During the second processing section PS2, the sensor driving unit 200C may compare the first coordinate information CD1 and the second coordinate information CD2 to determine whether the first coordinate information CD1 and the second coordinate information CD2 coincide with each other. The sensor driving unit 200C may compare the first coordinate value and the second coordinate value. For example, the sensor driving unit 200C may compare the x values of the first coordinate value and the second coordinate value and may compare the y values of the first coordinate value and the second coordinate value. When the first coordinate value and the second coordinate value coincide with each other, the sensor driving unit 200C may determine that the first coordinate information CD1 and the second coordinate information CD2 coincide with each other.

The third sensing frame SF3 may progress after the second sensing frame SF2. The sensor driving unit 200C may transmit the activated start signal INT (for example, a toggled start signal whose level is changed from a first state, e.g., a high level, to a second state, e.g., a low level) during the third sensing frame SF3 and the coordinate signal I-SS including the second coordinate information CD2 to the processor 1000C. When the start signal INT is activated, the processor 1000C may receive the coordinate signal I-SS including the second coordinate information CD2.

The third sensing frame SF3 may include a third scan section SS3 and a third processing section PS3. The driving operation of the sensor driving unit 200C during the third scan section SS3 may be substantially the same as the driving operation of the sensor driving unit 200C during the second scan section SS2, and the driving operation of the sensor driving unit 200C during the third processing section PS3 may be substantially the same as the driving operation of the sensor driving unit 200C during the second processing section PS2.

A first response time FTL1 may be defined as a time from a point in time when the touch input TC is made to a point in time when the start signal INT is activated. That is, the first response time FTL1 may be defined as a time taken for the sensor driving unit 200C to sense the touch input TC and to transmit the coordinate signal I-SS after the touch input TC is made.

When the frequency of one frame is 120 Hz, that is, when the period of one sensing frame is 8.33 ms, the first response time FTL1 may be 25.0 ms. However, this is only an example, and the first response time FTL1 according to an embodiment of the present disclosure is not limited thereto. For example, when the initial frame MSF is omitted, the first response time FTL1 may be 16. 7 ms. Also, the first response time FTL1 may change depending on the frequency of one sensing frame.

When the touch input TC is provided to the sensor layer 200, a spike-like noise may occur with a given probability. The sensor driving unit 200C may further operate based on a buffer frame to ignore a signal measured in a frame where a ghost touch is made. Accordingly, the phenomenon that the spike-like noise is sensed as a ghost touch may be prevented. In this case, the first response time FTL1 may become relatively long. However, according to the present disclosure, the sensor driving unit 200C may compare the first coordinate information CD1 stored in the memory with the second coordinate information CD2 during the second processing section PS2. When the first coordinate information CD1 and the second coordinate information CD2 coincide with each other, the sensor driving unit 200C may determine that the spike-like noise does not occur and may omit the buffer frame. Accordingly, the first response time FTL1 may be shortened. This may mean that the electronic device 1000 with improved sensing reliability is provided.

Also, unlike the present disclosure, when a sensor driving unit necessarily includes the buffer frame to prevent the ghost touch due to the spike-like noise, to shorten the first response time FTL1, the sensor driving unit may increase a report rate of the sensing frame SF and may operate at the increased report rate. When the report rate increases, power consumption may increase. However, according to the present disclosure, the sensor driving unit 200C may determine the presence or absence of the spike-like noise, and the sensor driving unit 200C may omit the buffer frame based on a determination result and thus may shorten the first response time FTL1. The sensor driving unit 200C may shorten the first response time FTL1 without increasing the report rate of the sensing frame SF. Accordingly, the electronic device display layer 100 whose power consumption is reduced may be provided.

Figure 9:
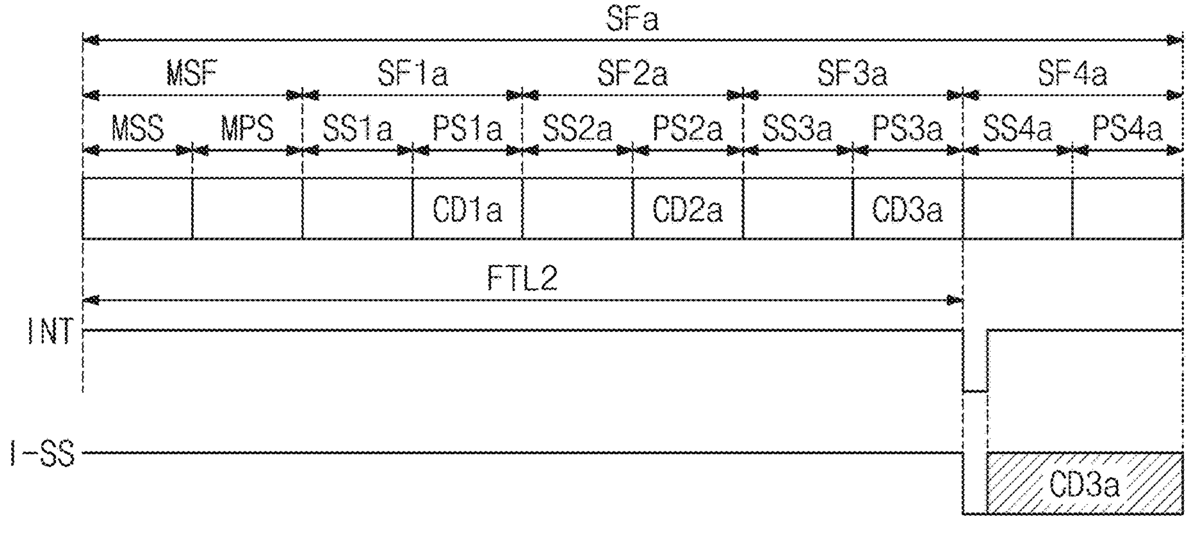
FIG. 9 is a diagram for describing how to drive an electronic device according to an embodiment of the present disclosure.
Figure 10A:
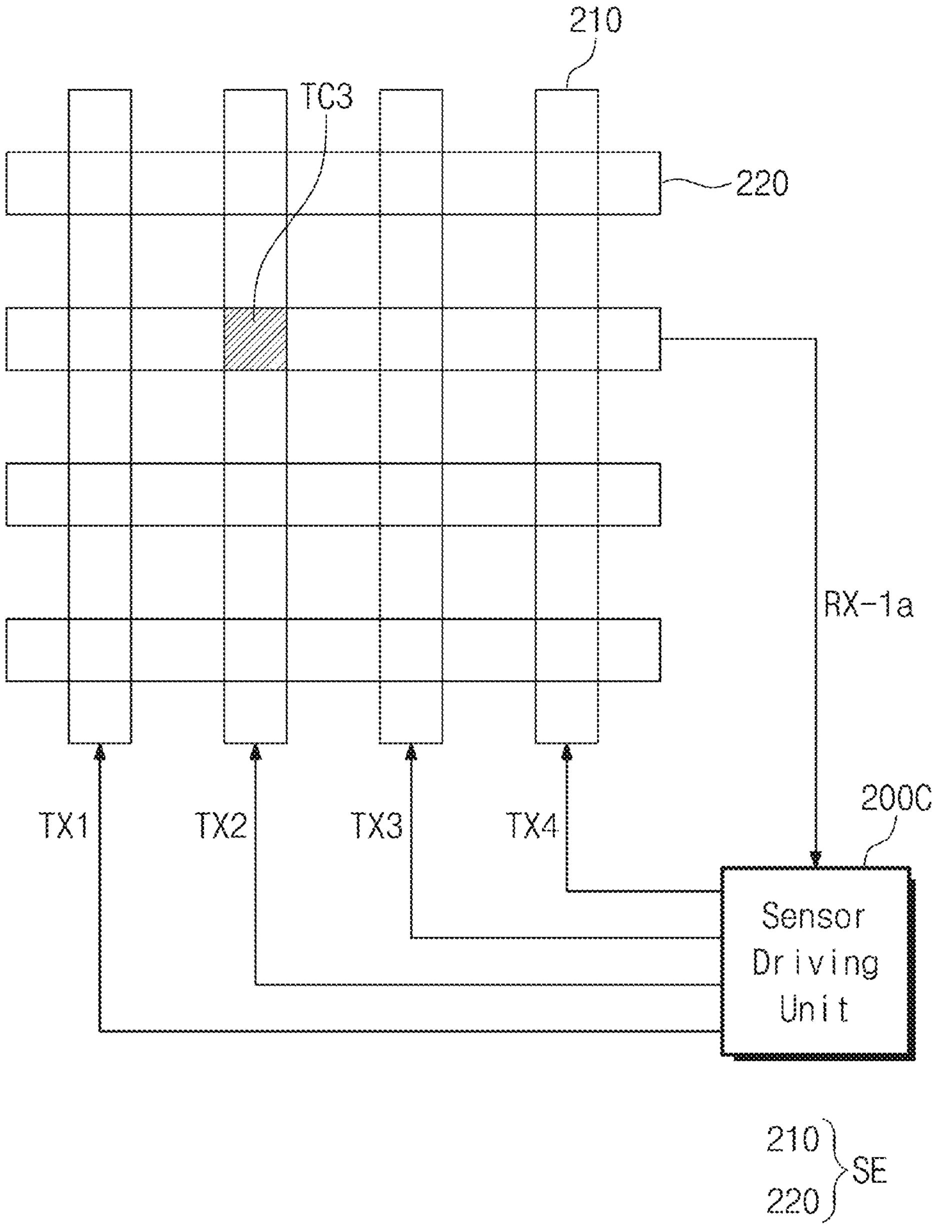
FIGS. 10A, 10B and 10C are diagrams for describing a sensor layer and a sensor driving unit according to an embodiment of the present disclosure.
Figure 10B:
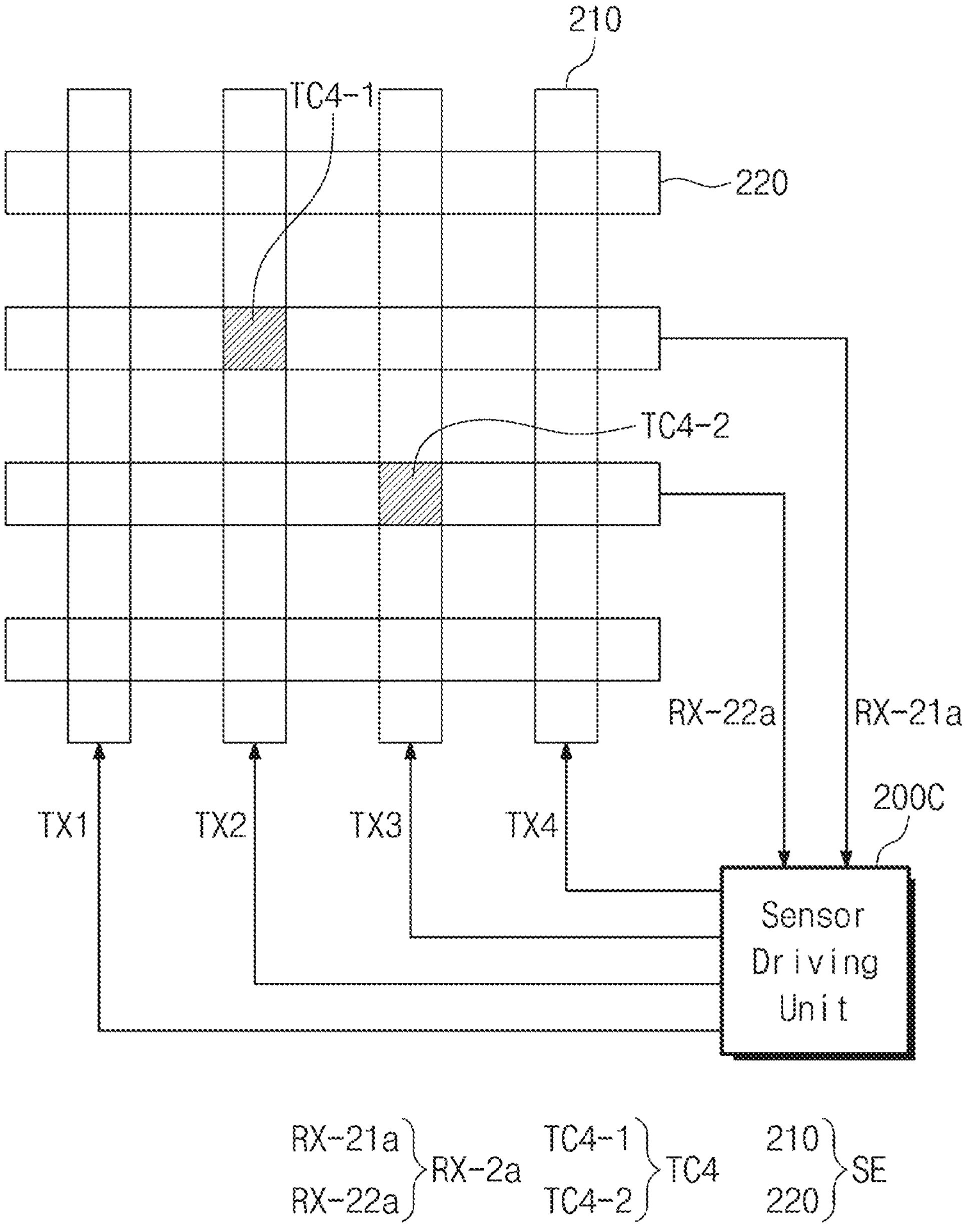
Figure 10C:
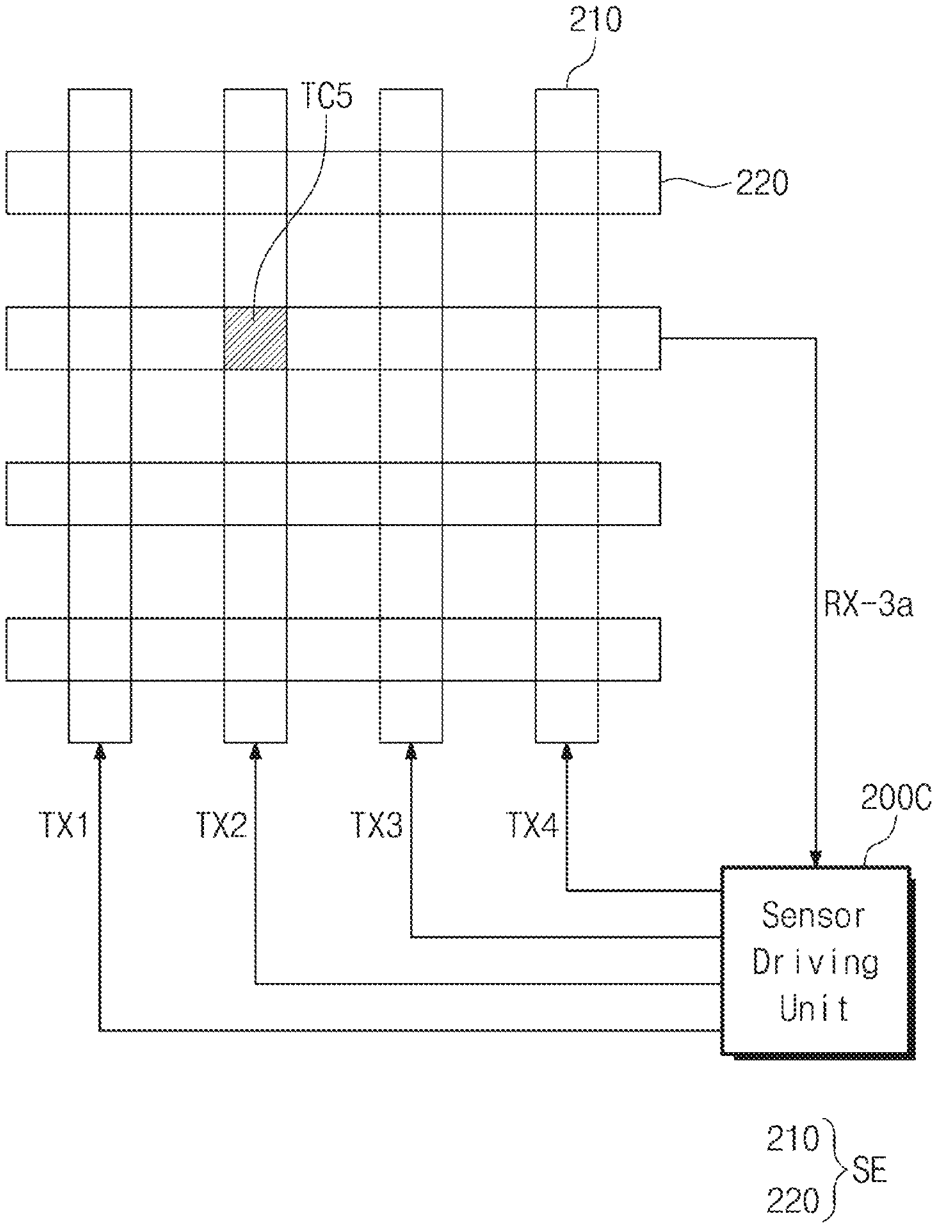

FIG. 9 is a diagram for describing how to drive an electronic device according to an embodiment of the present disclosure. FIGS. 10A to 10C are diagrams for describing a sensor layer and a sensor driving unit according to an embodiment of the present disclosure. In the description of FIGS. 9 to 10C, the components which are described with reference to FIGS. 7 to 8B are marked by the same reference numerals/signs, and thus, additional description will be omitted to avoid redundancy.

Referring to FIGS. 2, 5, and 9 to 10C, to sense the touch input TC, the sensor driving unit 200C may drive the sensor layer 200 in units of sensing frame SFa. The driving frequency of the sensing frame SFa may be 120 hertz (Hz). That is, the period of the sensing frame SFa may be 8.3 milliseconds (ms). However, this is an example, and the driving frequency of the sensor frame SFa according to an embodiment of the present disclosure is not limited thereto. The sensing frame SFa may include the initial frame MSF, a first sensing frame SF1*a*, a second sensing frame SF2*a*, a third sensing frame SF3*a*, and a fourth sensing frame SF4*a*.

The touch input TC may include a third touch input TC3, a fourth touch input TC4, and a fifth touch input TC5. The third touch input TC3 may be the touch input TC sensed during the first sensing frame SF1*a*, and the fourth touch input TC4 may be the touch input TC sensed during the second sensing frame SF2*a*. The fifth touch input TC5 may be the touch input TC sensed during the third sensing frame SF3*a*.

FIG. 10A shows operations of the sensor layer 200 and the sensor driving unit 200C in the first frame SF1*a* according to an embodiment of the present disclosure. After the initial frame MSF, the sensor driving unit 200C may operate the first frame SF1*a*. In the first frame SF1*a*, unlike the initial frame MSF, the touch input TC may be provided from a beginning of the first frame SF1*a*. The touch input TC may include the third touch input TC3, the fourth touch input TC4 following the third touch input TC3, and the fifth touch input TC5 following the fourth touch input TC4. The third touch input TC3, the fourth touch input TC4, and the fifth touch input TC5 may be a same signal having different timing, and locations in which the third touch input TC3, the fourth touch input TC4, and the fifth touch input TC5 may be substantially identical. The third touch input TC3 may be provided during the first frame SF1*a*, the fourth touch input TC4 may be provided during the second frame SF2*a*, and the fifth touch input TC5 may be provided during the third frame SF3*a*.

The first frame SF1*a* may include a first scan section SS1*a* and a first processing section PS1*a*. During the first scan section SS1*a*, the sensor driving unit 200C may transmit the plurality of driving signals TX1, TX2, TX3, and TX4 to the plurality of sensing electrodes SE. In this case, the sensor driving unit 200C may transmit the plurality of driving signals TX1, TX2, TX3, and TX4 during the first scan section SS1*a* repeatedly by less than the given number of times.

A mode illustrated in FIG. 10A, that is, a mode where the plurality of driving signals TX1, TX2, TX3, and TX4 are provided to the plurality of first sensing electrodes 210 repeatedly by less than the given number of times may be referred to as an "idle scan mode". Even in the initial scan section MSS, the sensor driving unit 200C may operate in the idle scan mode.

When the plurality of sensing electrodes SE operate in the mutual capacitance manner, each of the plurality of second sensing electrodes 220 may output a sensing signal RX-1*a* corresponding to each of the plurality of driving signals TX1 to TX4 respectively input to the plurality of first sensing electrodes 210. Only one sensing signal corresponding to the third touch input TC3 is illustrated in FIG. 10A.

According to the present disclosure, the sensor driving unit 200C may operate in the idle scan mode until the touch input TC is detected. During the idle scan mode, the sensor driving unit 200C may provide the plurality of driving signals TX1, TX2, TX3, and TX4 by less than the given number of times. Until the touch input TC is sensed, the sensor driving unit 200C may perform a minimum driving operation capable of determining the presence or absence of the touch input TC, and thus, the power consumption of the sensor driving unit 200C may be reduced.

The sensor driving unit 200C may generate first coordinate information CD1*a* of the third touch input TC3 during the first processing section PS1*a* based on the sensing signal RX-1*a* applied during the first scan section SS1*a* and may store the first coordinate information CD1*a* during the first processing section PS1*a*. The first coordinate information CD1*a* may be stored in a memory disposed in the sensor driving unit 200C. The first coordinates information CD1*a* may include a third coordinate value. The third coordinate value may be expressed by the coordinate system. For example, the third coordinate value may be expressed in the form of (x, y), where x indicating an x value corresponding to the first axis extending in the first direction DR1 and a y value corresponding to the second axis extending in the second direction DR2.

During the first frame SF1*a*, the sensor driving unit 200C may determine the presence or absence of the third touch input TC3 based on the first coordinate information CD1*a*.

FIG. 10B shows operations of the sensor layer 200 and the sensor driving unit 200C in the second frame SF2*a* according to an embodiment of the present disclosure. After the first frame SF1*a*, the sensor driving unit 200C may operate the second frame SF2*a*. When the sensor driving unit 200C determines that the third touch input TC3 is made in a previous sensing frame, for example, the first sensing frame SF1*a*, the sensor driving unit 200C may switch a mode. For example, the sensor driving unit 200C may switch from the idle scan mode to an active scan mode, that is, may operate in the active scan mode. The fourth touch input TC4 may be provided during the second frame SF2*a*.

The fourth touch input TC4 may include a (4-1)-th input TC4-1 and a (4-2)-th input TC4-2. The (4-1)-th input TC4-1 may be an intended touch input, and the (4-2)-th input TC4-2 may be an unintended touch input. For example, the (4-2)-th input TC4-2 may be made by the static electricity. The (4-2)-th input TC4-2 may be referred to as a "spike-like noise".

The second frame SF2*a* may include a second scan section SS2*a* and a second processing section PS2*a*. During the second scan section SS2*a*, the sensor driving unit 200C may transmit the plurality of driving signals TX1, TX2, TX3, and TX4 to the plurality of sensing electrodes SE. In this case, the sensor driving unit 200C may transmit the plurality of driving signals TX1, TX2, TX3, and TX4 during the second scan section SS2*a* repeatedly by the given number of times or more.

A mode illustrated in FIG. 10B, that is, a mode where the plurality of driving signals TX1, TX2, TX3, and TX3 are provided to the plurality of first sensing electrodes 210 repeatedly by the given number of times or more may be referred to as the "active scan mode". That is, the plurality of driving signals TX1, TX2, TX3, and TX4 may be provided more in the active scan mode than in the idle scan mode. That is, the sensor driving unit 200C may apply more driving signals TX to the plurality of sensing electrodes SE in the second scan section SS2*a* than in the first scan section SS1.

When the plurality of sensing electrodes SE operate in the mutual capacitance manner, each of the plurality of second sensing electrodes 220 may output a sensing signal RX-2*a* corresponding to each of the plurality of touch driving signals TX1 to TX4 respectively input to the plurality of first sensing electrodes 210. A sensing signal RX-21*a* corresponding to the (4-1)-th input TC4-1 and a sensing signal RX-22*a* corresponding to the (4-2)-th input TC4-2 are illustrated in FIG. 10B.

The sensor driving unit 200C may generate second coordinate information CD2*a* of the fourth touch input TC4 during the second processing section PS2*a* based on the sensing signal RX-2*a* applied during the second scan section SS2*a* and may store the second coordinate information CD2*a* during the second processing section PS2*a*. The second coordinate information CD2*a* may be stored in the memory disposed in the sensor driving unit 200C. The second coordinate information CD2*a* may include a (4-1)-th coordinate value calculated by the sensing signal RX-21*a* and a (4-2)-th coordinate value calculated by the sensing signal RX-22*a*. The (4-1)-th coordinate value and the (4-2)-th coordinate value may be expressed by the coordinate system.

During the second processing section PS2*a*, the sensor driving unit 200C may compare the first coordinate information CD1*a* and the second coordinate information CD2*a* to determine whether the first coordinate information CD1 and the second coordinate information CD2 coincide with each other.

The sensor driving unit 200C may compare the third coordinate value and the (4-1)-th coordinate value. For example, the sensor driving unit 200C may compare the x values of the third coordinate value and the (4-1)-th coordinate value and may compare the y values of the third coordinate value and the (4-1)-th coordinate value. The third coordinate value and the (4-1)-th coordinate value may coincide with each other.

The sensor driving unit 200C may compare the third coordinate value and the (4-2)-th coordinate value. For example, the sensor driving unit 200C may compare the x values of the third coordinate value and the (4-2)-th coordinate value and may compare the y values of the third coordinate value and the (4-2)-th coordinate value. The third coordinate value and the (4-2)-th coordinate value may not coincide with each other. The (4-2)-th input TC4-2 which is not intended may be generated by the spike-like noise, and the sensor driving unit 200C may sense the (4-2)-th input TC4-2 and may calculate the (4-2)-th coordinate value.

The first coordinate information CD1*a* and the second coordinate information CD2*a* may not coincide with each other due to the (4-2)-th coordinate value. The sensor driving unit 200C may further operate based on the third sensing frame SF3*a*. When the sensor driving unit 200C determines that the first coordinate information CD1*a* and the second coordinate information CD2*a* do not coincide with each other, the sensor driving unit 200C may not activate the start signal and may not transmit the second coordinate information CD2*a* to the processor 1000C. In this case, the second sensing frame SF2*a* may be referred to as a "buffer frame".

FIG. 10C shows operations of the sensor layer 200 and the sensor driving unit 200C in the third frame SF3*a* according to an embodiment of the present disclosure. After the second frame SF2*a*, the sensor driving unit 200C may operate the third frame SF3*a*. When the sensor driving unit 200C determines, in a previous sensing frame, that the first coordinate information CD1*a* and the second coordinate information CD2*a* do not coincide with each other, the sensor driving unit 200C may operate the third sensing frame SF3*a*. The sensor driving unit 200C may operate in the active scan mode during the third sensing frame SF3*a*. The fifth touch input TC5 may be provided during the third frame SF3*a*.

The third frame SF3*a* may include a third scan section SS3*a* and a third processing section PS3*a*. During the third scan section SS3*a*, the sensor driving unit 200C may transmit the plurality of driving signals TX1, TX2, TX3, and TX4 to the plurality of sensing electrodes SE. In this case, the sensor driving unit 200C may transmit the plurality of driving signals TX1, TX2, TX3, and TX4 during the third scan section SS3*a* repeatedly by the given number of times or more.

When the plurality of sensing electrodes SE operate in the mutual capacitance manner, each of the plurality of second sensing electrodes 220 may output a sensing signal RX-3*a* corresponding to each of the plurality of touch driving signals TX1 to TX4 respectively input to the plurality of first sensing electrodes 210. Only one sensing signal corresponding to the fifth touch input TC5 is illustrated in FIG. 10C.

The sensor driving unit 200C may generate third coordinate information CD3*a* of the fifth touch input TC5 during the third processing section PS3*a* based on the sensing signal RX-3*a* applied during the third scan section SS3*a* and may store the third coordinate information CD3*a* during the third processing section PS3*a*. The third coordinate information CD3*a* may be stored in the memory disposed in the sensor driving unit 200C. The third coordinates information CD3*a* may include a fifth coordinate value. The fifth coordinate value may be expressed by the coordinate system.

The fourth sensing frame SF4*a* may progress after the third sensing frame SF3*a*. The sensor driving unit 200C may transmit the activated start signal INT during the fourth sensing frame SF4*a* and the coordinate signal I-SS including the third coordinate information CD3*a* to the processor 1000C. When the start signal INT is activated, the processor 1000C may receive the coordinate signal I-SS including the third coordinate information CD3*a*.

The fourth sensing frame SF4*a* may include a fourth scan section SS4*a* and a fourth processing section PS4*a*. The driving operation of the sensor driving unit 200C during the fourth scan section SS4*a* may be substantially the same as the driving operation of the sensor driving unit 200C during the second scan section SS2*a*, and the driving operation of the sensor driving unit 200C during the fourth processing section PS4*a* may be substantially the same as the driving operation of the sensor driving unit 200C during the second processing section PS2*a*.

A second response time FTL2 may be defined as a time from a point in time when the touch input TC is made to a point in time when the start signal INT is activated. That is, the second response time FTL2 may be defined as a time taken for the sensor driving unit 200C to sense the touch input TC and to transmit the coordinate signal I-SS after the touch input TC is made.

The second response time FTL2 may be 33.3 ms. However, this is only an example, and the second response time FTL2 according to an embodiment of the present disclosure is not limited thereto. For example, when the initial frame MSF is omitted, the second response time FTL2 may be 25.0 ms.

When the touch input TC is provided to the sensor layer 200, a spike-like noise may occur with a given probability. According to the present disclosure, the sensor driving unit 200C may compare the first coordinate information CD1*a* and the second coordinate information CD2*a*. When the first coordinate information CD1*a* and the second coordinate information CD2*a* do not coincide with each other, the sensor driving unit 200C may further operate the third sensing frame SF3*a* and may ignore a signal measured in a frame where the ghost touch is made, for example, the signal measured in the second sensing frame SF2*a*. Accordingly, the phenomenon that the spike-like noise is sensed as a ghost touch may be prevented. This may mean that the electronic device 1000 with improved sensing reliability is provided.

Figure 11A:
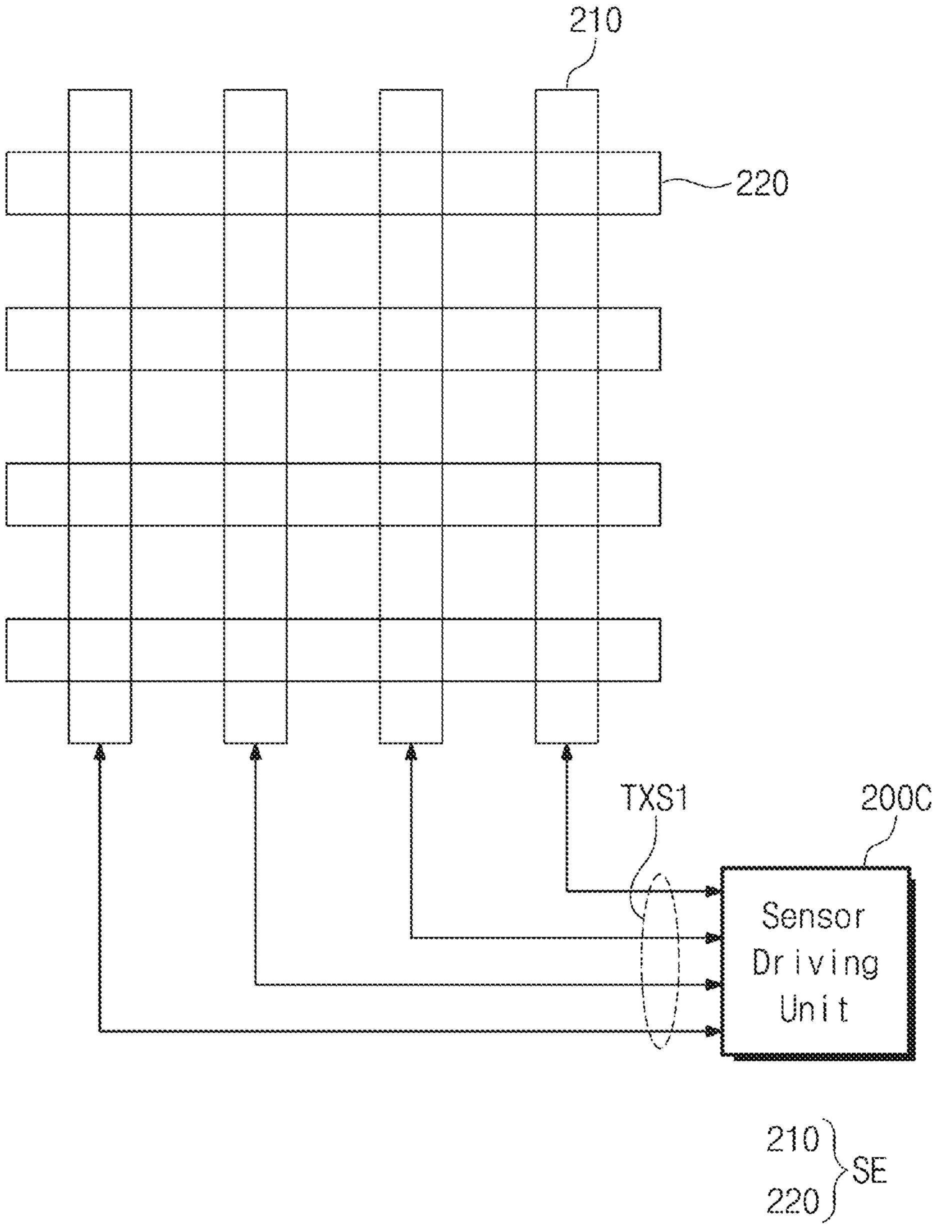
FIGS. 11A and 11B are diagrams for describing a sensor layer and a sensor driving unit according to an embodiment of the present disclosure.
Figure 11B:
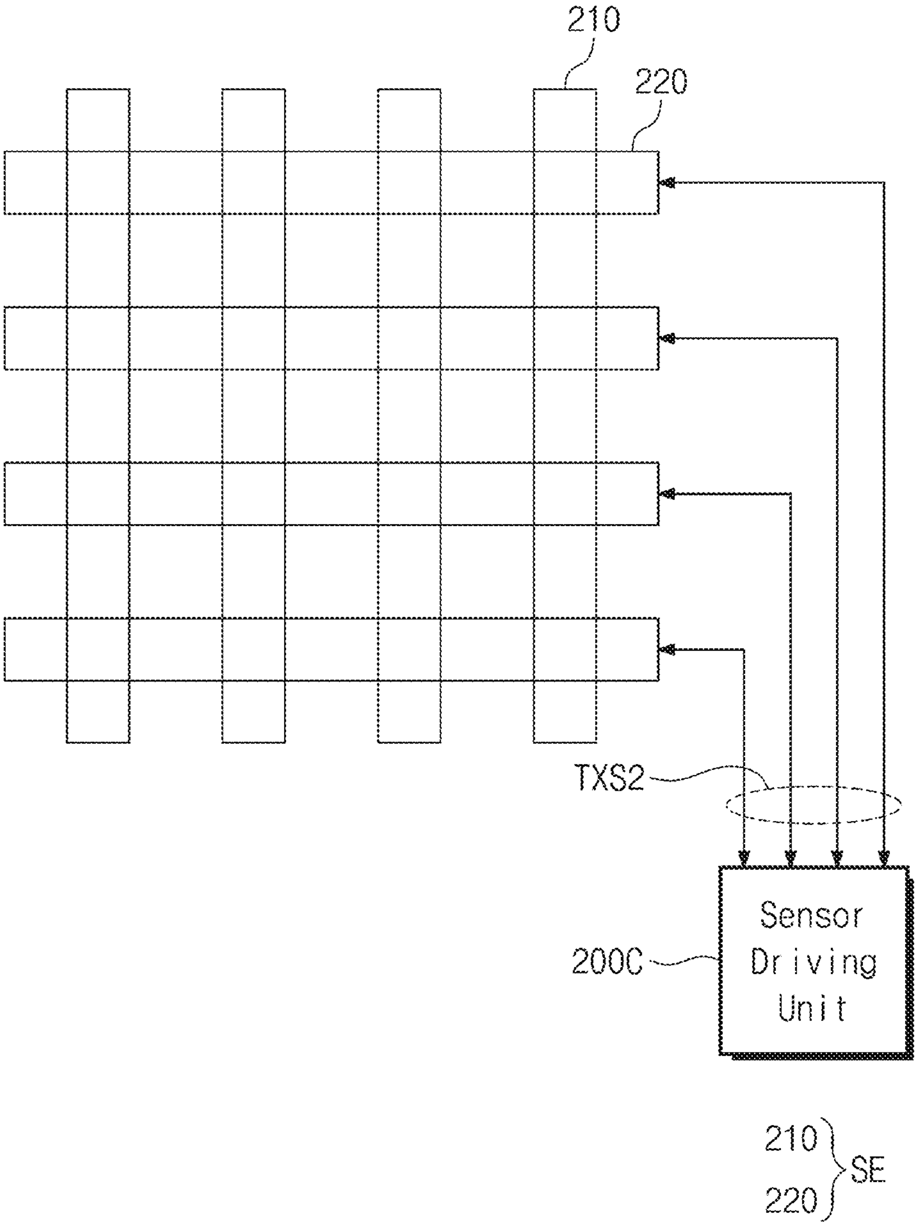

FIGS. 11A and 11B are diagrams for describing a sensor layer and a sensor driving unit according to an embodiment of the present disclosure.

Referring to FIGS. 2, 7, 11A, and 11B, the plurality of sensing electrodes SE may receive the touch input TC. The plurality of sensing electrodes SE may operate in a self-capacitance manner. The sensor driving unit 200C may transmit self-driving signals TXS1 and TXS2 to the plurality of sensing electrodes Se. The self-driving signals TXS1 and TXS2 may include a plurality of first self-signals TXS1 and a plurality of second self-signals TXS2.

During the first sensing frame SF1, the sensor driving unit 200C may generate and store first coordinate information. The first coordinate information may include (1-1)-th information and (1-2)-th information.

During the first sensing frame SF1, the sensor driving unit 200C may transmit the plurality of first self-signals TXS1 to the plurality of first sensing electrodes 210. The plurality of first sensing electrodes 210 may output (1-1)-th self-sensing signals corresponding to the first sensing electrodes 210. The sensing driving unit 200C may store information about the first sensing electrode to which the touch input TC is input from among the plurality of first sensing electrodes 210. The (1-1)-th self-sensing signals may include the (1-1)-th information about one selected from the plurality of first sensing electrodes 210.

During the first sensing frame SF1, the sensor driving unit 200C may transmit the plurality of second self-signals TXS2 to the plurality of second sensing electrodes 220. The plurality of second sensing electrodes 220 may output (1-2)-th self-sensing signals corresponding to the second sensing electrodes 220. The sensing driving unit 200C may store information about the second sensing electrode to which the touch input TC is input from among the plurality of second sensing electrodes 220. The (1-2)-th self-sensing signals may include the (1-2)-th information about one selected from the plurality of second sensing electrodes 220.

During the second sensing frame SF2, the sensor driving unit 200C may generate and store second coordinate information. The second coordinate information may include (2-1)-th information and (2-2)-th information.

During the second sensing frame SF2, the sensor driving unit 200C may transmit the plurality of first self-signals TXS1 to the plurality of first sensing electrodes 210. The plurality of first sensing electrodes 210 may output (2-1)-th self-sensing signals corresponding to the first sensing electrodes 210, The sensing driving unit 200C may store information about the first sensing electrode to which the touch input TC is input from among the plurality of first sensing electrodes 210. The (2-1)-th self-sensing signals may include the (2-1)-th information about one selected from the plurality of first sensing electrodes 210.

During the second sensing frame SF2, the sensor driving unit 200C may transmit the plurality of second self-signals TXS2 to the plurality of second sensing electrodes 220. The plurality of second sensing electrodes 220 may output (2-2)-th self-sensing signals corresponding to the second sensing electrodes 220. The sensing driving unit 200C may store information about the first sensing electrode to which the touch input TC is input from among the plurality of second sensing electrodes 220. The (2-2)-th self-sensing signals may include the (2-2)-th information about one selected from the plurality of second sensing electrodes 220.

During the second sensing frame SF2, the sensor driving unit 200C may compare the (1-1)-th information and the (2-1)-th information to determine whether the (1-1)-th information and the (2-1)-th information coincide with each other and may compare the (1-2)-th information and the (2-2)-th information to determine whether the (1-2)-th information and the (2-2)-th information coincide with each other.

When the (1-1)-th information and the (2-1)-th information coincide with each other and the (1-2)-th information and the (2-2)-th information coincide with each other, the sensor driving unit 200C may transmit the activated start signal INT and the second coordinate information after the second sensing frame SF2 to the processor 1000C.

When the touch input TC is provided to the sensor layer 200, a spike-like noise may occur with a given probability. The sensor driving unit 200C may further operate based on a buffer frame to ignore a signal measured in a frame where a ghost touch is made. Accordingly, the phenomenon that the spike-like noise is sensed as a ghost touch may be prevented. In this case, the first response time FTL1 may become relatively long. However, according to the present disclosure, the sensor driving unit 200C may compare the first coordinate information and the second coordinate information. When the first coordinate information and the second coordinate information coincide with each other, the sensor driving unit 200C may determine that the spike-like noise does not occur and may omit the buffer frame. Accordingly, the first response time FTL1 may be shortened. This may mean that the electronic device 1000 with improved sensing reliability is provided.

Also, unlike the present disclosure, when a sensor driving unit necessarily includes the buffer frame to prevent the ghost touch due to the spike-like noise, to shorten the first response time FTL1, the sensor driving unit may increase a report rate of the sensing frame SF and may operate at the increased report rate. When the report rate increases, power consumption may increase. However, according to the present disclosure, the sensor driving unit 200C may determine the presence or absence of the spike-like noise, and the sensor driving unit 200C may omit the buffer frame based on a determination result and thus may shorten the first response time FTL1. The sensor driving unit 200C may shorten the first response time FTL1 without increasing the report rate of the sensing frame SF. Accordingly, the electronic device display layer 100 whose power consumption is reduced may be provided.

Referring to FIGS. 2, 9, 11A, and 11B, when the (1-1)-th information is different from the (2-1)-th information or when the (1-2)-th information is different from the (2-2)-th information, the sensor driving unit 200C may further operate based on the third sensing frame SF3*a*.

During the third sensing frame SF3*a*, the sensor driving unit 200C may generate third coordinate information.

The sensor driving unit 200C may transmit the activated start signal INT and the third coordinate information after the third sensing frame SF3*a* to the processor 1000C.

When the touch input TC is provided to the sensor layer 200, a spike-like noise may occur with a given probability. According to the present disclosure, the sensor driving unit 200C may compare the first coordinate information and the second coordinate information. When the first coordinate information and the second coordinate information do not coincide with each other, the sensor driving unit 200C may further operate the third sensing frame SF3*a* and may ignore a signal measured in a frame where the ghost touch is made. Accordingly, the phenomenon that the spike-like noise is sensed as a ghost touch may be prevented. This may mean that the electronic device 1000 with improved sensing reliability is provided.

According to the above description, a sensor driving unit may compare first coordinate information stored in a memory with second coordinate information, which is sensed during a second scan period, during a second processing section. When the first coordinate information and the second coordinate information coincide with each other, it may be determined that a spike-like noise does not occur. In this case, the buffer frame may be omitted. Accordingly, a response time which is a time taken for the sensor driving unit to sense a touch input and to transmit a coordinate signal, after the touch input is made, may be shortened. Accordingly, an electronic device with improved sensing reliability may be provided.

According to the above description, the sensor driving unit may determine the presence or absence of the spike-like noise to omit the buffer frame, and thus, the response time may be shortened. The sensor driving unit may shorten the response time even without increasing the report rate of a sensing frame. Accordingly, an electronic device in which power consumption is reduced may be provided.

According to the above description, sensor driving unit compare the first coordinate information and the second coordinate information. When the first coordinate information and the second coordinate information do not coincide with each other, the sensor driving unit may further operate a third sensing frame and may ignore a signal measured in a frame where the ghost touch is made. As the spike-like noise is not sensed as a ghost touch, an electronic device with improved sensing reliability may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a sensor layer including a plurality of sensing electrodes; and a sensor driving unit configured to drive the sensor layer in units of sensing frame, wherein the sensing frame includes:

a first sensing frame including a first scan section and a first processing section; and a second sensing frame following the first sensing frame and including a second scan section and a second processing section, wherein the sensor driving unit is configured to:

generate first coordinate information during the first scan section;

store the first coordinate information during the first processing section;

generate second coordinate information during the second scan section;

store the second coordinate information during the second processing section; and determine whether the first coordinate information and the second coordinate information coincide with each other by comparing the first coordinate information and the second coordinate information, wherein, during the first scan section, the sensor driving unit applies driving signals to the plurality of sensing electrodes arranged on an active area of the sensor layer, wherein, when the sensor driving unit determines that a touch input is received during the first sensing frame, the sensor driving unit changes a number of times of applying the driving signals to the plurality of sensing electrodes, and wherein, when the first coordinate information and the second coordinate information coincide with each other, the sensor driving unit is configured to transmit an activated start signal and the second coordinate information to a processor.

2. The electronic device of claim 1, wherein the first coordinate information includes a first coordinate value, and wherein the second coordinate information includes a second coordinate value.

3. The electronic device of claim 2, wherein the processor is configured to drive the sensor driving unit, and wherein the first coordinate value and the second coordinate value are compared with each other to determine the coincidence between the first coordinate information and the second coordinate information.

4. The electronic device of claim 3, wherein, when the start signal is activated, the processor is configured to receive the second coordinate information.

5. The electronic device of claim 3, wherein the sensing frame further includes a third sensing frame following the second sensing frame, and wherein, when the first coordinate value and the second coordinate value are different from each other, the sensor driving unit is configured to generate third coordinate information having a third coordinate value during the third sensing frame.

6. The electronic device of claim 5, wherein the sensor driving unit transmits the activated start signal and the third coordinate information after the third sensing frame to the processor.

7. The electronic device of claim 1, wherein the sensor driving unit applies more driving signals to the plurality of sensing electrodes in the second scan section than those in the first scan section.

8. The electronic device of claim 7, wherein the sensor driving unit receives sensing signals respectively corresponding to the driving signals from the plurality of sensing electrodes.

9. The electronic device of claim 1, wherein the plurality of sensing electrodes include:

a plurality of first sensing electrodes each extending in a first direction; and a plurality of second sensing electrodes each extending in a second direction intersecting the first direction.

10. The electronic device of claim 9, wherein the first coordinate information includes (1-1)-th information about one selected from the plurality of first sensing electrodes and (1-2)-th information about one selected from the plurality of second sensing electrodes, and wherein the second coordinate information includes a (2-1)-th information about one selected from the plurality of first sensing electrodes and (2-2)-th information about one selected from the plurality of second sensing electrodes.

11. An electronic device comprising:

a sensor layer including a plurality of sensing electrodes; and a sensor driving unit configured to drive the sensor layer in units of sensing frame, wherein the sensing frame includes:

a first sensing frame including a first scan section and a first processing section; and a second sensing frame following the first sensing frame and including a second scan section and a second processing section, wherein the sensor driving unit is configured to:

generate first coordinate information during the first scan section;

store the first coordinate information during the first processing section;

generate second coordinate information during the second scan section;

store the second coordinate information during the second processing section; and determine whether the first coordinate information and the second coordinate information coincide with each other by comparing the first coordinate information and the second coordinate information, wherein the plurality of sensing electrodes include:

a plurality of first sensing electrodes each extending in a first direction; and a plurality of second sensing electrodes each extending in a second direction intersecting the first direction, wherein the first coordinate information includes (1-1)-th information about one selected from the plurality of first sensing electrodes and (1-2)-th information about one selected from the plurality of second sensing electrodes, wherein the second coordinate information includes a (2-1)-th information about one selected from the plurality of first sensing electrodes and (2-2)-th information about one selected from the plurality of second sensing electrodes, and wherein the sensor driving unit is configured to:

determine whether the (1-1)-th information and the (2-1)-th information coincide with each other by comparing the (1-1)-th information and the (2-1)-th information during the second sensing frame; and determine whether the (1-2)-th information and the (2-2)-th information coincide with each other by comparing the (1-2)-th information and the (2-2)-th information during the second sensing frame.

12. The electronic device of claim 11, further comprising:

a processor configured to drive the sensor driving unit, wherein, when the (1-1)-th information and the (2-1)-th information coincide with each other and the (1-2)-th information and the (2-2)-th information coincide with each other, the sensor driving unit transmits an activated start signal and the second coordinate information after the second sensing frame to the processor.

13. The electronic device of claim 12, wherein the sensing frame further includes a third sensing frame following the second sensing frame, wherein, when the (1-1)-th information and the (2-1)-th information are different from each other or when the (1-2)-th information and the (2-2)-th information are different from each other, the sensor driving unit generates third coordinate information during the third sensing frame.

14. The electronic device of claim 13, wherein the sensor driving unit transmits the activated start signal and the third coordinate information after the third sensing frame to the processor.

* * * * *